United States Patent
Tanimoto

(10) Patent No.: US 10,701,240 B2
(45) Date of Patent: Jun. 30, 2020

(54) PRINT HEAD AND IMAGE FORMING APPARATUS

(71) Applicant: Toshiba Tec Kabushiki Kaisha, Tokyo (JP)

(72) Inventor: Koji Tanimoto, Tagata Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/244,893

(22) Filed: Jan. 10, 2019

(65) Prior Publication Data
US 2019/0268498 A1    Aug. 29, 2019

(30) Foreign Application Priority Data

Feb. 23, 2018  (JP) .................. 2018-030427

(51) Int. Cl.
| | | |
|---|---|---|
| *H04N 1/40* | (2006.01) | |
| *H04N 1/50* | (2006.01) | |
| *G03G 15/043* | (2006.01) | |
| *G06K 15/02* | (2006.01) | |
| *G03G 15/04* | (2006.01) | |

(52) U.S. Cl.
CPC ....... *H04N 1/40031* (2013.01); *G03G 15/043* (2013.01); *G03G 15/04045* (2013.01); *G06K 15/027* (2013.01); *H04N 1/506* (2013.01); *G03G 2215/00059* (2013.01); *G03G 2215/00063* (2013.01); *G03G 2215/00164* (2013.01)

(58) Field of Classification Search
CPC .. H04N 1/40031; H04N 1/506; H04N 1/4015; H04N 5/2354; H04N 1/04; H04N 1/02865; H04N 1/0282; H04N 1/028; G03G 15/043; G03G 15/04045; G03G 2215/00059; G03G 2215/00164; G03G 2215/00063; G06K 15/027
USPC ......................................... 347/225
See application file for complete search history.

(56) References Cited

U.S. PATENT DOCUMENTS

| | | | |
|---|---|---|---|
| 5,854,958 A | 12/1998 | Tanimoto et al. | |
| 9,106,861 B2 | 8/2015 | Miyadera et al. | |
| 9,471,001 B2 | 10/2016 | Iijima et al. | |
| 2002/0054203 A1* | 5/2002 | Yamada ................. | B41J 2/45 347/232 |
| 2010/0135699 A1* | 6/2010 | Yamaguchi ....... | G03G 15/04045 399/220 |
| 2017/0351193 A1* | 12/2017 | Ishikawa ............. | G03G 15/043 |
| 2018/0241907 A1 | 8/2018 | Ishikawa et al. | |

FOREIGN PATENT DOCUMENTS

| | | |
|---|---|---|
| JP | 2014140972 A | 8/2014 |
| JP | 2016087912 A | 5/2016 |

* cited by examiner

*Primary Examiner* — Huan H Tran
*Assistant Examiner* — Alexander D Shenderov
(74) *Attorney, Agent, or Firm* — Kim & Stewart LLP

(57) ABSTRACT

In accordance with an embodiment, a print head includes a first light emitting element line and a second light emitting element line. The first light emitting element line and the second light emitting element line each include a plurality of light emitting elements that emit light on the basis of image data. The plurality of light emitting elements of the second light emitting element line are arranged deviated from the plurality of light emitting elements of the first light emitting element line by a certain interval in a main scanning direction.

13 Claims, 28 Drawing Sheets

PRINT HEAD AND IMAGE FORMING APPARATUS

CROSS-REFERENCE TO RELATED APPLICATION

This application is based upon and claims the benefit of priority from the prior Japanese Patent Application No. 2018-030427, filed on Feb. 23, 2018, the entire contents of which are incorporated herein by reference.

FIELD

An embodiment described here generally relates to a print head and an image forming apparatus.

BACKGROUND

A printer, a copying machine, and a multi-functional peripheral (MFP) using an electrophotographic process are known. Two types of means called laser optical system (laser scan unit (LSU)) and print head (imaging bar) are known as light exposure means (light exposure unit) for those devices. The laser optical system exposes a photosensitive drum to light by reflecting a laser beam from a semiconductor laser element via a rotatable polygon mirror and scanning the photosensitive drum. The print head exposes a photosensitive drum to light by scanning the photosensitive drum with light emitted from a plurality of light emitting elements such as light emitting diodes (LEDs).

The laser optical system consumes a lot of power and generates operation noise in forming an image because the laser optical system needs to rotate the polygon mirror at high speed. Moreover, the laser optical system has a large size in many cases because the laser optical system needs a mechanism that scans laser light and a lens group for forming an image of scan light on the photosensitive drum.

On the other hand, the print head can achieve downsizing with a structure in which an image of light emitted from a plurality of light emitting elements is formed on the photosensitive drum via small-size lenses that form an erect image, which is called rod lens array. Further, the print head is a less-power consumption, silent light exposure unit because the print head does not include a movable portion.

Some of developed print heads use organic light emitting diodes (OLEDs) instead of the LEDs (array of LED chips).

The print head using the LEDs typically has LED chips arrayed on a printed board.

The print head using the OLEDs has the OLEDs formed on a substrate by using a mask at a time. In the print head using the OLEDs, light emitting elements can be precisely arranged. For example, a print head in which a plurality of light emitting elements including the OLEDs are formed on a glass substrate is known.

The plurality of light emitting elements of the print head corresponds to one line in a main scanning direction. Each of the light emitting elements emits light on the basis of pixel information read from a page memory. Further, various technologies have been proposed, concerning how to read the pixel information stored in the page memory for image tilt correction.

DETAILED DESCRIPTION

In accordance with one embodiment, a print head for forming an image on the basis of image data includes a substrate, a first light emitting element line, and a second light emitting element line. The substrate extends in a main scanning direction of the image. The first light emitting element line is arranged at a position in the main scanning direction on the substrate. The first light emitting element line includes a plurality of light emitting elements that emit light on the basis of the image data. The second light emitting element line is arranged at a position in the main scanning direction on the substrate, which is a position different from the position of the first light emitting element line in a sub-scanning direction orthogonal to the main scanning direction. The second light emitting element line includes a plurality of light emitting elements that emit light on the basis of the image data. The plurality of light emitting elements of the second light emitting element line are arranged on the substrate, deviated from each other by a certain interval in the main scanning direction with respect to the plurality of light emitting elements of the first light emitting element line.

Hereinafter, an embodiment will be described with reference to the drawings. In each figure, the same reference signs denote the same or similar portions.

Figure 1:
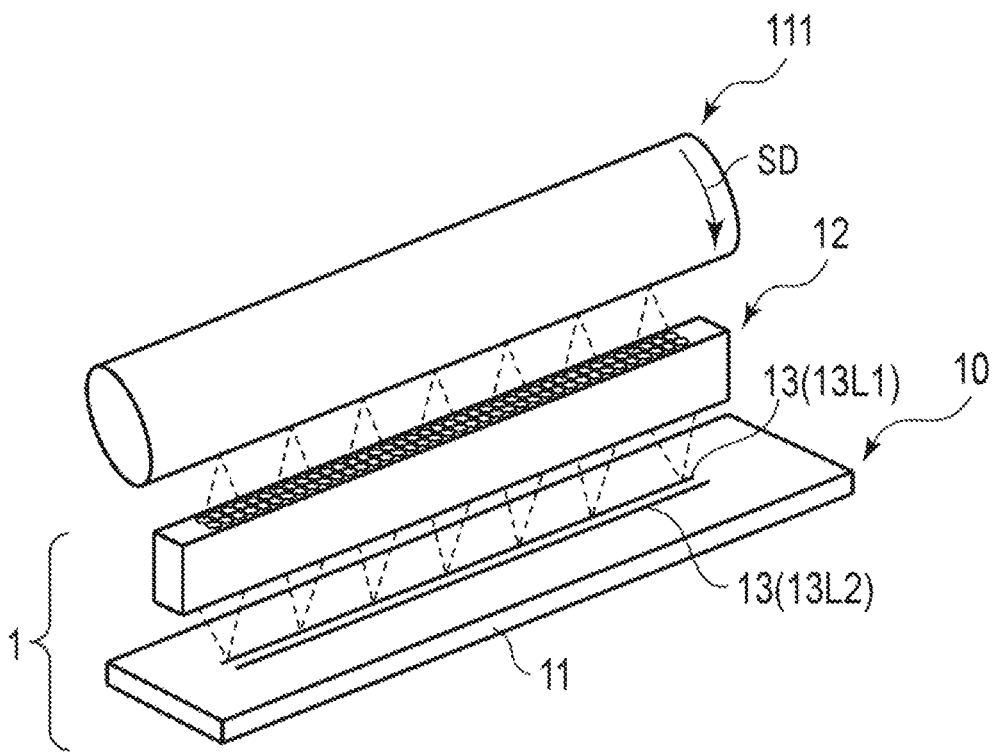
FIG. 1 is a diagram showing a relationship between a photosensitive drum and a print head according to an embodiment.

FIG. 1 shows an example of a positional relationship between a photosensitive drum 111 and a print head 1 to be used in an electrophotographic process according to the embodiment. The photosensitive drum 111 shown in FIG. 1 is provided in an image forming apparatus such as a printer, a copying machine, and a multi-functional peripheral, for example. The print head 1 is arranged to be opposite to the photosensitive drum 111.

The photosensitive drum 111 rotates in the arrow direction shown in FIG. 1. That rotation direction will be referred to as a sub-scanning direction SD. The photosensitive drum 111 is uniformly charged by a charging device. The charged photosensitive drum 111 is exposed to light from the print head 1. In this manner, the potential of a portion of the photosensitive drum 111, which is exposed to light, is lowered. That is, an electrostatic latent image can be formed on the photosensitive drum 111 by controlling the print head 1 to emit light or not to emit light.

The print head 1 includes a light emitting portion 10 and a rod lens array 12. Further, the light emitting portion 10 includes a transparent substrate 11. The transparent substrate is a glass substrate which permits light to pass therethrough, for example. A plurality of light emitting element lines 13 each including a plurality of light emitting elements, for example, are formed on the transparent substrate 11. FIG. 1 shows an example in which two lines of a first light emitting element line 13L1 and a second light emitting element line 13L2 are formed in parallel with each other.

Figure 2:
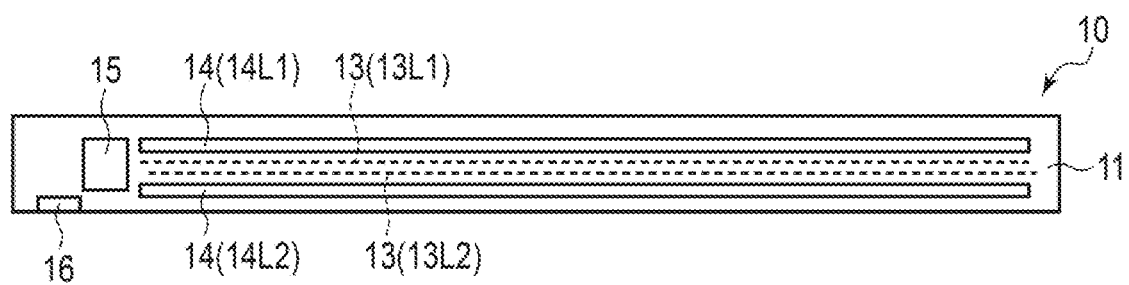
FIG. 2 is a diagram showing an example of a light emitting section of the print head according to the embodiment.

FIG. 2 shows an example of the light emitting portion 10 of the print head 1 according to the embodiment.

The light emitting portion 10 includes the transparent substrate 11. As shown in FIG. 2, the two light emitting element lines 13 (first light emitting element line 13L1 and second light emitting element line 13L2) are formed at a center portion on the transparent substrate 11, extending in a longitudinal direction of the transparent substrate 11. DRV circuit lines 14 (first DRV circuit line 14L1 and second DRV circuit line 14L2) for driving the respective light emitting elements (causing the light emitting elements to emit light) are formed in vicinity of the light emitting element lines 13.

In FIG. 2, the DRV circuit lines 14 for driving the light emitting elements (causing the light emitting elements to emit light) are arranged on both sides of the two light emitting element lines 13. Alternatively, the DRV circuit lines 14 may be arranged on one side.

The two light emitting element lines 13 and the DRV circuit lines 14 will be described later in detail. Further, the transparent substrate 11 includes a head circuit 15 and a connector 16. The head circuit 15 is an integrated circuit (IC) including a light emitting element address counter 151, decoders 152, and D/A conversion circuits 153 to be described later. The connector 16 electrically connects to the print head 1 and a control system of the printer, the copying machine, or the multi-functional peripheral. This connection enables electric power supply, head control, image data transfer, and the like to be performed. A substrate for sealing to prevent the light emitting element lines 13, the DRV circuit lines 14, and the like from being exposed to the outside air is attached to the transparent substrate 11.

Figure 3:
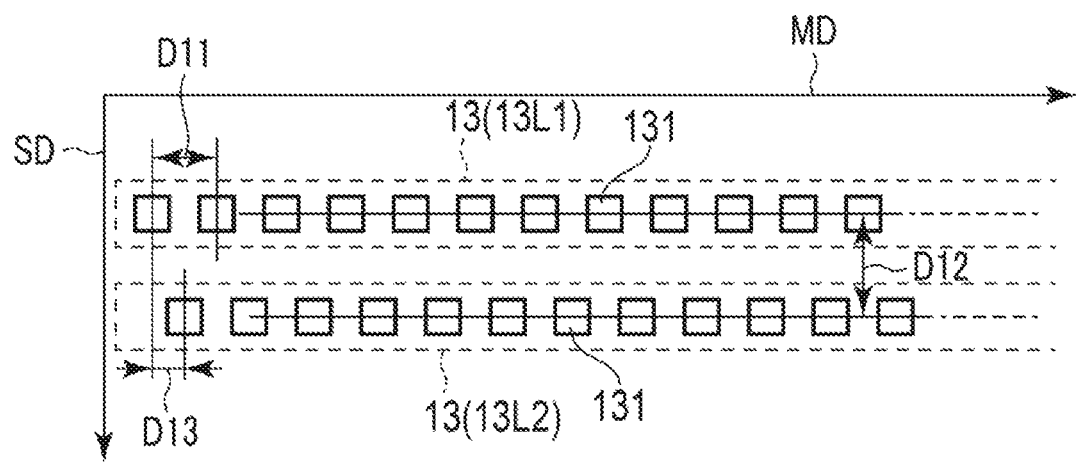
FIG. 3 is a diagram showing an array of light emitting elements on a transparent substrate in the print head according to the embodiment.

FIG. 3 shows an example of the light emitting element lines 13 of the print head (two-line head) according to the embodiment. As shown in FIG. 3, the light emitting element lines 13 (first light emitting element line 13L1 and second light emitting element line 13L2) each include a plurality of light emitting elements 131 arrayed in a main scanning direction MD orthogonal to the movement direction (sub-scanning direction SD) of the photosensitive drum 111. That is, the array direction of the plurality of light emitting elements 131 which form the light emitting element lines 13 of the first line and the array direction of the plurality of light emitting elements 131 which form the light emitting element lines 13 of the second line are both parallel to the main scanning direction MD.

Further, as shown in FIG. 3, each of the light emitting elements 131 has a square shape having a length of 20 µm, for example. An arrangement interval D11 between the light emitting elements 131 is a pitch of about 42.3 µm such that the resolution is 600 dpi, for example. That is, the plurality of light emitting elements 131 of the second light emitting element line 13L2 are arranged deviated from each other by a certain interval (arrangement interval D11) in the main scanning direction with respect to the plurality of light emitting elements 131 of the first light emitting element line 13L1.

Further, as shown in FIG. 3, the light emitting element lines 13 of the first line and the light emitting element lines 13 of the second line are arranged having an interval therebetween, which is a distance D12 in the sub-scanning direction SD. In addition, each of the light emitting elements 131 which form the light emitting element lines 13 of the first line and each of the light emitting elements 131 which form the light emitting element lines 13 of the second line are arranged deviated from each other by a predetermined pitch D13 in the main scanning direction MD. For example, the predetermined pitch D13 is ½ of the arrangement interval D11. With this configuration, the two light emitting element lines 13 are put in staggered arrangement.

When the light emitting elements of the light emitting element lines 13 of the first and second lines are caused to emit light at the same timing, a staggered light exposure pattern is formed on the photosensitive drum 111. The upstream side in the movement direction of the photosensitive drum 111 is defined as the first line and the downstream side in the movement direction of the photosensitive drum 111 is defined as the second line. A controller (controller 174 in FIG. 8) to be described later controls the light emitting element lines 13 of the first line and the light emitting element lines 13 of the second line to emit light at different timings in a manner that depends on the movement speed and the distance D12 of the photosensitive drum 111. That is, the controller 174 controls the light emitting timing of the light emitting element lines 13 of the second line relative to the light emitting element lines 13 of the first line to be delayed by a certain time in the manner that depends on the movement speed and the distance D12 of the photosensitive drum 111. In other words, the controller 174 outputs (transfers) first light emitting element image data to the light emitting element lines 13 of the first line and second light emitting element image data to the light emitting element lines 13 of the second line at the different timings in the manner that depends on the movement speed and the distance D12 of the photosensitive drum 111. Here, the first light emitting element image data and the second light emitting element image data correspond to image data for one line in the main scanning direction. With this configuration, an electrostatic latent image is formed at a resolution of 1200 dpi on the photosensitive drum.

An increase in density of an image can be achieved by the controller 174 controlling the light emitting timings (image data-transferring timings) of the plurality of light emitting element lines 13 in this manner. In a case of the two light emitting element lines 13, the image density can be doubled as compared to the density of the light emitting elements 131 in one line. For example, in a case of n (n 3, n: integer) light emitting element lines 13, the image density can be increased by n-times as compared to the density of the light emitting elements 131 in one line.

Figure 4:
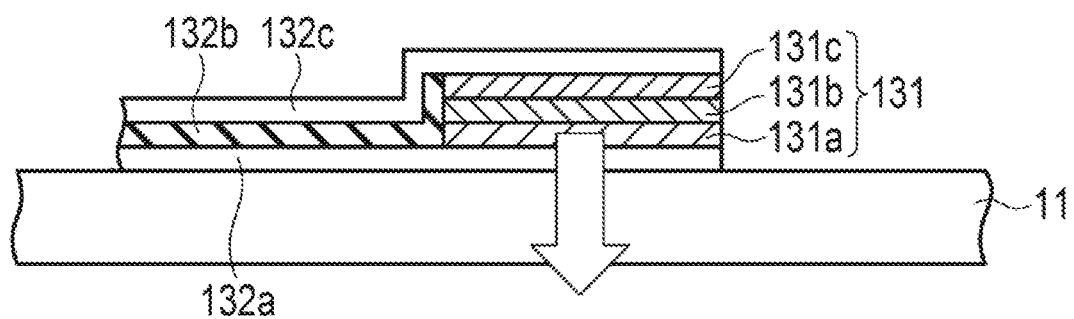
FIG. 4 is a cross-sectional view showing an example of one of the light emitting elements of the print head according to the embodiment.

FIG. 4 shows an example of a cross-sectional structure of one of the light emitting elements 131 according to the embodiment. It should be noted that the substrate for sealing is omitted from FIG. 4. As shown in FIG. 4, the light emitting element 131 includes a hole transport layer 131a, an emissive layer 131b, and an electron transport layer 131c. The light emitting element 131 is directly sandwiched by an electrode (+) 132a and an electrode (−) 132c which are insulated from each other by an insulating layer 132b. It should be noted that in this embodiment, the emissive layer 131b is an OLED, for example. The electrode (−) 132c has a structure that reflects light emitted from the emissive layer 131b. With such a structure, light emitted from the emissive layer 131b is output from the transparent substrate 11.

Figure 5:
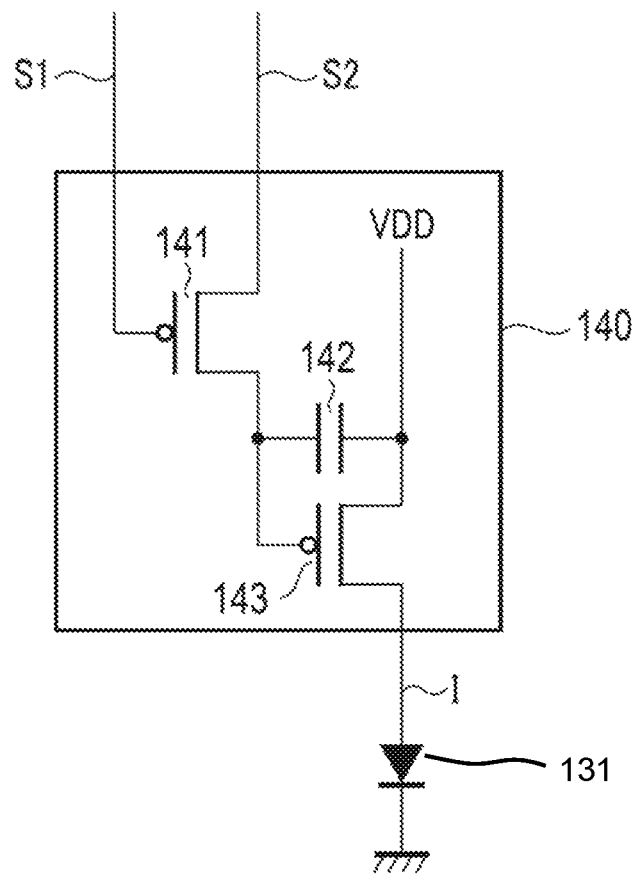
FIG. 5 is a diagram showing an example of a configuration of a DRV circuit of the print head according to the embodiment.

FIG. 5 shows an example of a DRV circuit 140 for driving the light emitting element according to the embodiment. As shown in FIG. 5, the DRV circuit 140 includes switching elements 141 and 143 and a capacitor 142. The DRV circuit 140 receives input of a selecting signal S1 and a light emitting level signal S2 supplied from the head circuit 15 (see FIG. 6) to be described later. The selecting signal S1 becomes an "L" level in changing the light emitting intensity of the light emitting element 131 connected to the DRV circuit 140. When the selecting signal S1 becomes the "L" level, the voltage of the capacitor 142 changes in a manner that depends on the voltage of the light emitting level signal S2.

When the selecting signal S1 becomes "H", the voltage of the capacitor 142 is maintained. Even if the voltage of the light emitting level signal S2 changes, the voltage level of the capacitor 142 does not change. Current depending on the voltage maintained by the capacitor 142 flows into the light emitting element 131 connected to a signal line I of the DRV circuit 140. In accordance with the selecting signal S1, a predetermined light emitting element 131 is selected from among the plurality of light emitting elements 131 of the light emitting element lines 13. In accordance with the light emitting level signal S2, the light emitting intensity of the selected light emitting element 131 can be determined and maintained.

Figure 6:
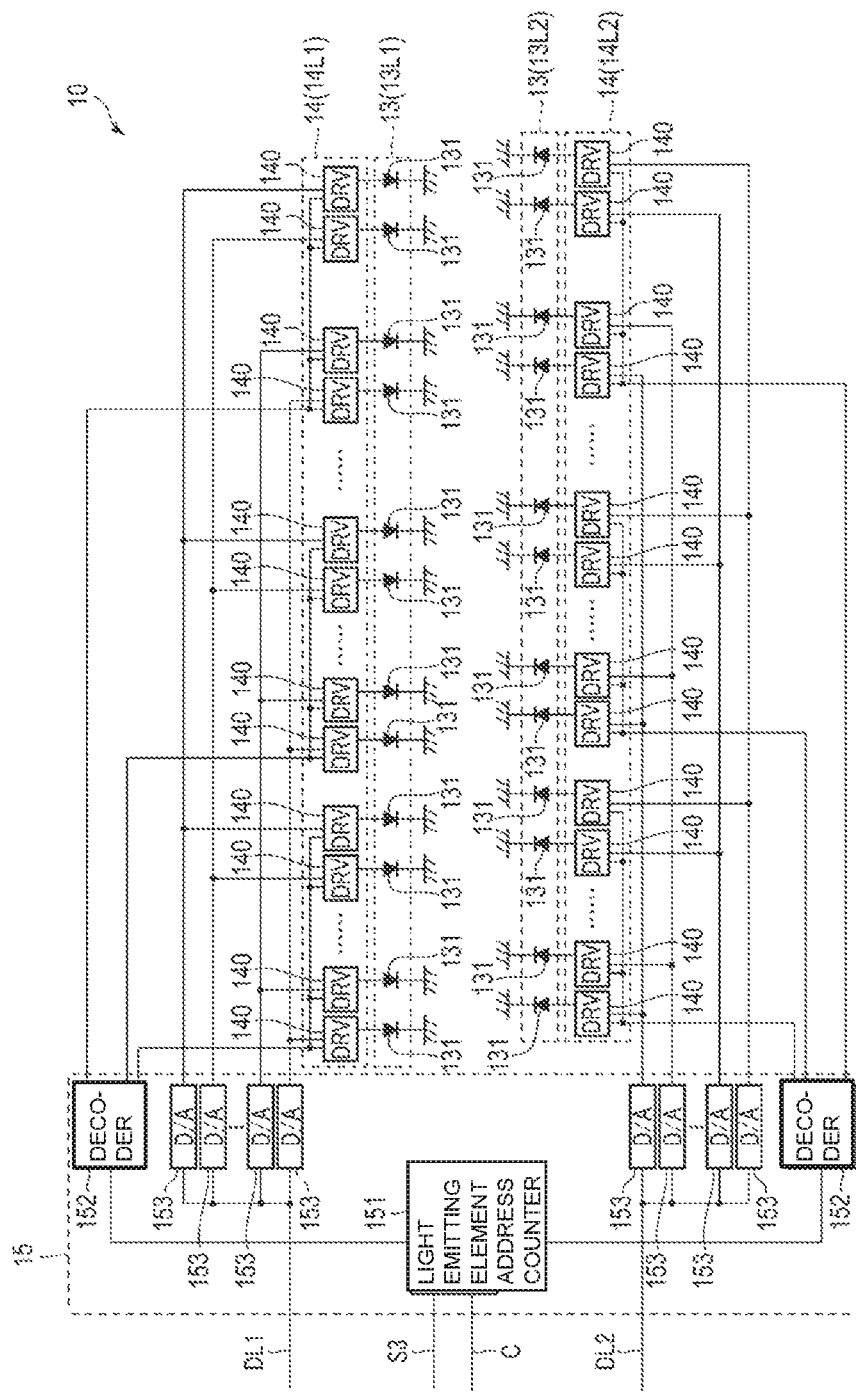
FIG. 6 is a diagram showing an example of a circuit configuration of the print head according to the embodiment.

FIG. 6 shows an example of a circuit configuration including the head circuit 15 of the print head 1 according to the embodiment. As shown in FIG. 6, the light emitting portion 10 includes the head circuit 15. The head circuit 15 includes the light emitting element address counter 151, the decoders 152, the digital-to-analog (D/A) conversion circuits 153, and the like. The head circuit 15 (light emitting element address counter 151, decoders 152, and D/A conversion circuits 153) supplies the DRV circuit 140 with the selecting signal S1 and the light emitting level signal S2 (see FIG. 5) for controlling the light emitting intensity of each light emitting element 131 and on/off of each light emitting element 131 (selection of each light emitting element 131).

As shown in FIG. 6, DRV circuits 140 are respectively connected to the light emitting elements 131. Each individual DRV circuit 140 supplies each individual light emitting element 131 with individual current. The D/A conversion circuit 153 is connected to the first DRV circuit line 14L1 connected to the first light emitting element line 13L1. Similarly, the D/A conversion circuit 153 is connected to the DRV circuit line 14L2 connected to the second light emitting element line 13L2.

Moreover, as shown in FIG. 6, a horizontal synchronization signal S3, an image data-writing clock C, and first light emitting element image data DL1, and second light emitting element image data DL2 are transmitted to the light emitting element address counter 151 through the connector 16 (see FIG. 2). It should be noted that the first light emitting element image data DL1 and the second light emitting element image data DL2 are transmitted in synchronization with the image data-writing clock C.

The horizontal synchronization signal S3 is for resetting a count value of the light emitting element address counter 151. The light emitting element address counter 151 counts the image data-writing clock C.

The count value of the light emitting element address counter 151 is for specifying which light emitting element 131 image data included in the first light emitting element image data DL1 and the second light emitting element image data DL2 comes from. The image data includes light emitting data and/or non-light emitting data. It should be noted that the first light emitting element image data DL1 and the second light emitting element image data DL2 will be collectively simply referred to the image data in some cases in the following description. The count value of the light emitting element address counter 151 is output to one of the decoders (selectors) 152.

The D/A conversion circuit 153 outputs an analog signal having a level, which corresponds to the light emitting data of the input image data described above, to the DRV circuit 140 as the light emitting level signal S2.

The decoder (selector) 152 sets the selecting signal S1 of the DRV circuit 140, which is connected to the line (light emitting element line 13) specified by the count value, to be "L". The selecting signals S1 of the DRV circuits 140 each become "L", and the analog signal level is thus maintained at the capacitor 142 in each DRV circuit 140.

The light emitting elements 131 connected to the DRV circuits 140 emit light at light intensity depending on the analog signal levels maintained at the capacitors 142 of the DRV circuits 140.

Also after the selecting signals S1 become "H", the light emitting elements 131 keep emitting light in accordance with the analog signal levels maintained at the capacitors 142.

It should be noted that in a case where the image data is non-light emitting data, the data input in the D/A conversion circuit 153, for example, becomes "00". The potential maintained at the capacitor 142 in this case becomes at such a level that the light emitting element 131 does not emit light. In the above-mentioned manner, the light emitting intensity of the light emitting element 131 is controlled.

Figure 7:
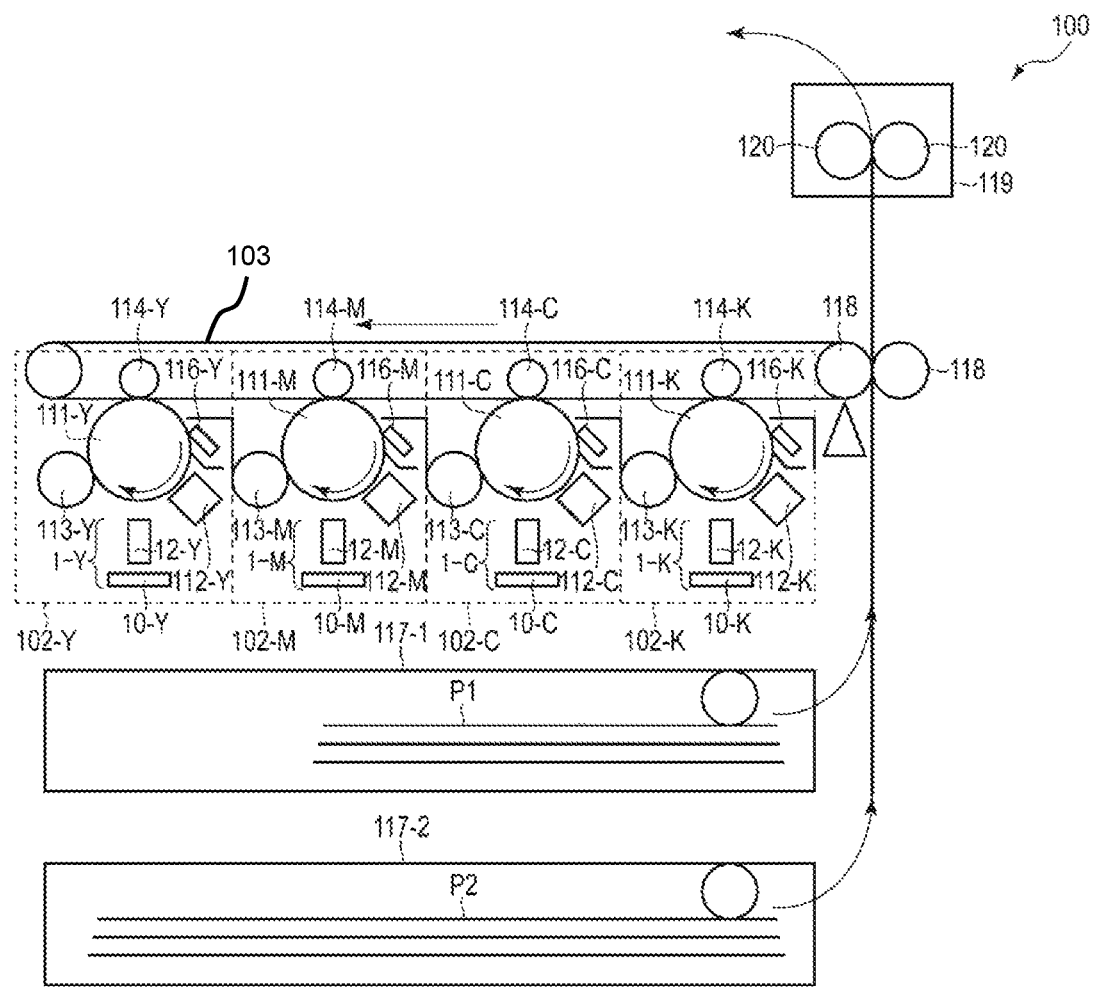
FIG. 7 is a cross-sectional view showing an image forming apparatus which is an application example of the print head according to the embodiment.

FIG. 7 shows an example of an image forming apparatus 100 to which the print head according to this embodiment is applied. The image forming apparatus 100 shown in FIG. 7 is an example of a color-image forming apparatus employing a 4-drum tandem method, though not limited thereto. The print head 1 according to this embodiment can also be applied to a monochrome-image forming apparatus, for example.

As shown in FIG. 7, for example, the image forming apparatus 100 includes an image forming device 102-Y, an image forming device 102-M, an image forming device 102-C, and an image forming device 102-K. The image forming apparatus 100 further includes a transfer device including a transfer belt 103 and transfer rollers 118, a fixing device 119, and sheet cassettes 117-1 and 117-2. The image forming device 102-Y forms an image in yellow (Y). The image forming device 102-M forms an image in magenta (M). The image forming device 102-C forms an image in cyan (C). The image forming device 102-K forms an image in black (K). The image forming devices 102-Y, 102-M, 102-C, and 102-K transfer the yellow, cyan, magenta, and black images formed by themselves to the transfer belt 103 in an overlapping manner. In this manner, a full-color image is formed on the transfer belt 103.

The image forming device 102-Y includes a charger 112-Y, a print head 1-Y, a developing device 113-Y, a transfer roller 114-Y, and a cleaner 116-Y around a photosensitive drum 111-Y. The image forming devices 102-M, 102-C, and 102-K also have a similar configuration.

It should be noted that in FIG. 7, configurations of the image forming device 102-Y that forms the image in yellow (Y) are denoted by the reference signs with "-Y". Configurations of the image forming device 102-M that forms the image in magenta (M) are denoted by the reference signs with "-M". Configurations of the image forming device 102-C that forms the image in cyan (C) are denoted by the reference signs with "-C" Configurations of the image forming device 102-K that forms the image in black (K) are denoted by the reference signs with "-K".

The chargers 112-Y, 112-M, 112-C, and 112-K evenly charge the photosensitive drums 111-Y, 111-M, 111-C, and 111-K, respectively. The print heads 1-Y, 1-M, 1-C, and 1-K respectively expose the photosensitive drums 111-Y, 111-M, 111-C, and 111-K to light by light emitting of the light emitting elements 131 of the first light emitting element line 13L1 and the second light emitting element line 13L2. With this light exposure, electrostatic latent images are formed on the photosensitive drums 111-Y, 111-M, 111-C, and 111-K. The developing device 113-Y causes yellow toner to adhere to the electrostatic latent image on the photosensitive drum 111-Y to thereby develop the electrostatic latent image and form a yellow toner image (yellow visible image) on the photosensitive drum 111-Y. The developing device 113-M causes magenta toner to adhere to the electrostatic latent image on the photosensitive drum 111-M to thereby develop the electrostatic latent image and form a magenta toner image (magenta visible image) on the photosensitive drum 111-Y. The developing device 113-C causes cyan toner to adhere to the electrostatic latent image on the photosensitive drum 111-C to thereby develop the electrostatic latent image and form a cyan toner image (cyan visible image) on the photosensitive drum 111-Y. The developing device 113-K causes black toner to adhere to the electrostatic latent image of the photosensitive drum 111-K to thereby develop the electrostatic latent image and form a black toner image (black visible image) on the photosensitive drum 111-Y.

The transfer rollers 114-Y, 114-M, 114-C, and 114-K transfer the images developed on the photosensitive drums 111-Y, 111-M, 111-C, and 111-K to the transfer belt 103. The cleaners 116-Y, 116-M, 116-C, and 116-K cleans remaining toner which has not been transferred to the photosensitive drums 111-Y, 111-M, 111-C, and 111-K for entering a stand-by state for next image forming.

Sheets (image-forming-target media) P1 of a first size (small size) are stored in the sheet cassette 117-1 which is a sheet-feeding means. Sheets (image-forming-target media) P2 of a second size (large size) are stored in the sheet cassette 117-2 which is a sheet-feeding means.

An image forming position (image forming range in the main scanning direction MD) needs to be changed in a manner that depends on a sheet size. The change in the image forming position will be described later in detail.

The toner images are transferred to the sheet P1 or P2 fed out from the sheet cassette 117-1 or 117-2 from the transfer belt 103 via the transfer roller pair 118 which is a transfer means. The sheet P1 or P2 to which the toner images are transferred is heated and pressed by fixing rollers 120 of the fixing device 119. The toner images are securely fixed on the sheet P1 or P2 by being heated and pressed by the fixing rollers 120. By repeating the above-mentioned process operation, the image forming operation is continuously performed.

Figure 8:
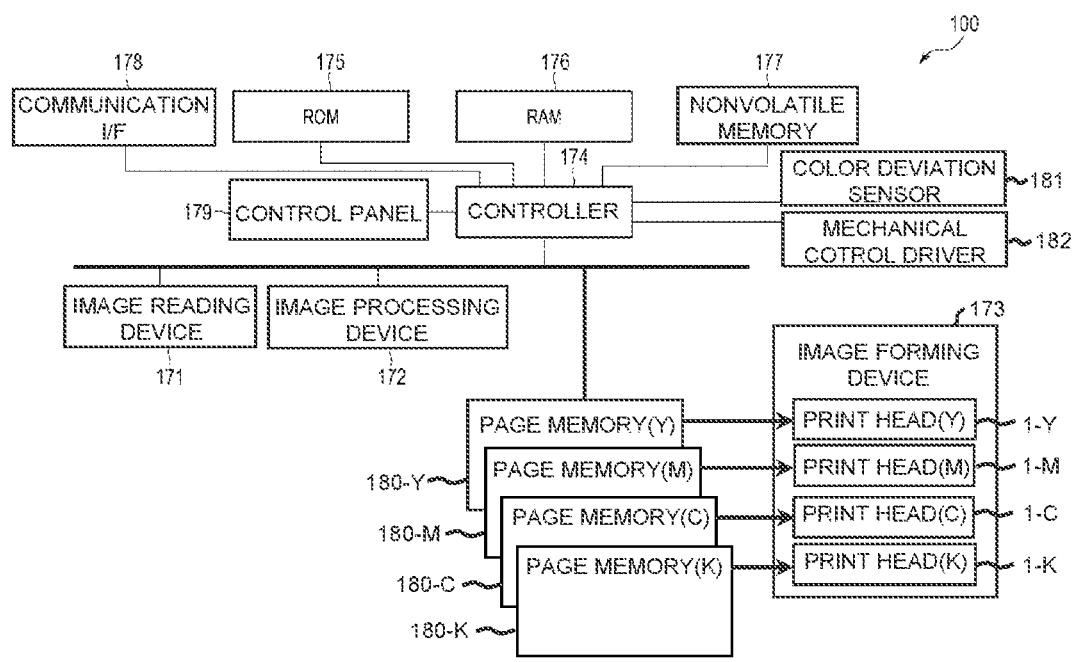
FIG. 8 is a block diagram showing an example of a control configuration of the image forming apparatus according to the embodiment.

FIG. 8 shows an example of a control system of the image forming apparatus 100 according to the embodiment. As shown in FIG. 8, the image forming apparatus 100 includes an image reading device 171, an image processing device 172, an image forming device 173, the controller 174, a read only memory (ROM) 175, a random access memory (RAM) 176, a nonvolatile memory 177, a communication I/F 178, a control panel 179, page memories 180-Y, 180-M, 180-C, and 180-K, a color deviation sensor 181, and a mechanical control driver 182. It should be noted that the image forming device 173 includes the image forming devices 102-Y, 102-M, 102-C, and 102-K.

The ROM 175, the RAM 176, the nonvolatile memory 177, the communication I/F 178, the control panel 179, the color deviation sensor 181, and the mechanical control driver 182 are connected to the controller 174.

The image reading device 171, the image processing device 172, and the page memories 180-Y, 180-M, 180-C, and 180-K are connected to an image data bus 183. The corresponding print heads 1-Y, 1-M, 1-C, and 1-K are connected to the page memories 180-Y, 180-M, 180-C, and 180-K.

The controller 174 is constituted by one or more processors and controls operations such as image reading, image processing, and image forming in accordance with various programs stored in at least one of the ROM 175 or the nonvolatile memory 177.

The ROM 175 stores various programs and the like necessary for control of the controller 174. The various programs include a program for specifying a main-scanning-direction range of an image (electrostatic latent image) formed by light exposure on the basis of an image forming condition and a program for assigning image data for the first light emitting element image data DL1 and the second light emitting element image data DL2 on the basis of the specified main-scanning-direction range. It should be noted that the image forming condition is at least one of color registration control result information, sheet cassette specifying information, or margin setting. The color registration control and the like will be described later in detail.

The RAM 176 temporarily stores data necessary for control of the controller 174. The nonvolatile memory 177 stores updated programs, various parameters, and the like. It should be noted that the nonvolatile memory 177 may store some of the various programs or all the various programs.

The mechanical control driver 182 controls operations of a motor and the like, which are necessary at the time of printing, in accordance with an instruction of the controller 174. The communication I/F 178 externally outputs various types of information and receives input of various types of external information. For example, the image forming apparatus 100 prints image data input via the communication I/F by using a printing function. The control panel 179 receives operation inputs from a user and a serviceman.

The image reading device 171 optically reads an image of a document to acquire image data, and outputs the acquired image data to the image processing device 172. The image processing device 172 performs various types of image processing (including correction and the like) on the image data input via the communication I/F 178 or the image data from the image reading device 171. The page memories 180-Y, 180-M, 180-C, and 180-K store the image data processed by the image processing device 172. The controller 174 controls the image data on the page memories 180-Y, 180-M, 180-C, and 180-K to be suitable for a printing position and the print head. The image forming device 173 forms images on the basis of the image data stored in the page memories 180-Y, 180-M, 180-C, and 180-K. Further, the image forming device 173 includes the print heads 1-Y, 1-M, 1-C, and 1-K.

Further, the controller 174 inputs data of test patterns into the page memories 180-Y, 180-M, 180-C, and 180-K and forms the test patterns on the transfer belt 103. The color deviation sensor 181 detects the test patterns formed on the transfer belt 103 and outputs a detection signal to the controller 174. The controller 174 is capable of recognizing a positional relationship between test patterns in respective colors on the basis of the detection signal from the color deviation sensor 181.

The controller 174 selects the sheet cassette 117-1 or 117-2 that feeds a sheet, on which an image is to be formed, through the mechanical control driver 182.

Figure 9:
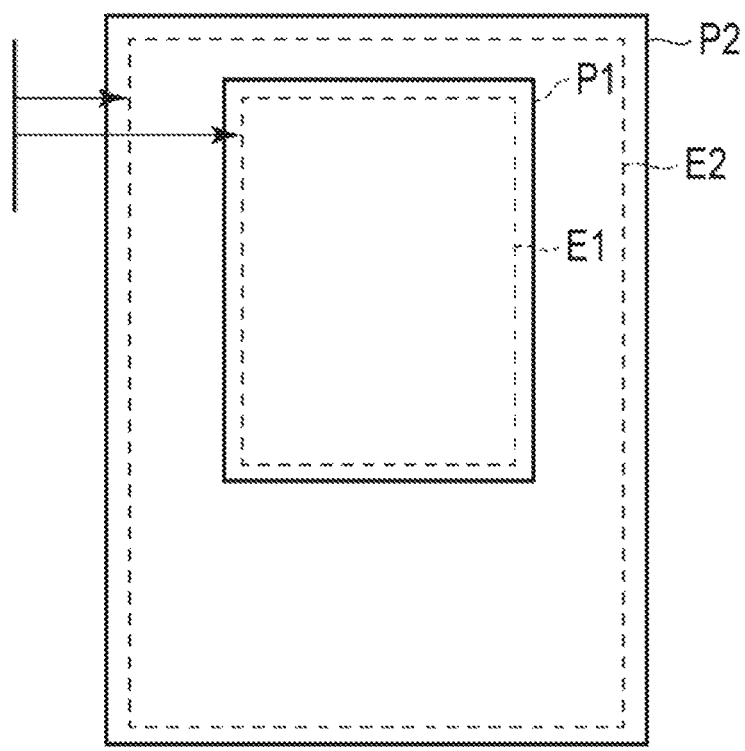
FIG. 9 is a diagram for describing the fact that an image forming area changes in a manner that depends on a sheet size and the like selected by the image forming apparatus according to the embodiment.

FIG. 9 shows an example of a relationship between a sheet size housed in the sheet cassette and an image forming position (image forming range in the main scanning direction MD and the sub-scanning direction SD). For example, the sheet P1 of the first size is stored in the sheet cassette 117-1 and the sheet P2 of the second size is stored in the sheet cassette 117-2. The controller 174 selects the sheet cassette 117-1 or 117-2 on the basis of sheet cassette specifying information included in a print job which is received via a network or sheet cassette specifying information from the control panel 179. The controller 174 controls feeding of the different-size sheet P1 or P2 by selecting the sheet cassette. In a case of forming an image on the sheet P1 of the first size, the image is formed in an area E1 shown as the dotted line of the sheet P1. In a case of forming an image on the sheet P2 of the second size, the image is formed in an area E2 shown as the dotted line of the sheet P2. In addition, the area E1 or E2 shown as the dotted line on the sheet P1 or P2 are changed (varied) on the basis of margin setting included in the print job or margin setting from the control panel 179. For example, as the set margin becomes larger in the main scanning direction MD, the size of the area E1 or E2 in the main scanning direction MD becomes smaller (the main-scanning-direction range of the area E1 or E2 becomes narrower).

That is, the controller 174 specifies the range of the area E1 or E2 in the main scanning direction MD and the sub-scanning direction SD on the basis of the image forming condition. For example, the controller 174 specifies at least one of the sheet size or margin setting and also specifies the range of the area E1 or E2 in the main scanning direction MD by using the center of the sheet in the main scanning direction as a reference (the center of the sheet in the main scanning direction corresponds to the center of the image in the main scanning direction). Therefore, some continuous light emitting elements 131 of the plurality of light emitting elements 131 of the first light emitting element line 13L1 of the print head 1 and some continuous light emitting elements 131 of the plurality of light emitting elements 131 of the second light emitting element line 13L2 are set to be targets of a light emitting operation based on the image data. That is, the main-scanning-direction range formed by some light emitting elements 131 set to be targets of the light emitting operation corresponds to the specified range in the main scanning direction MD.

Figure 10:
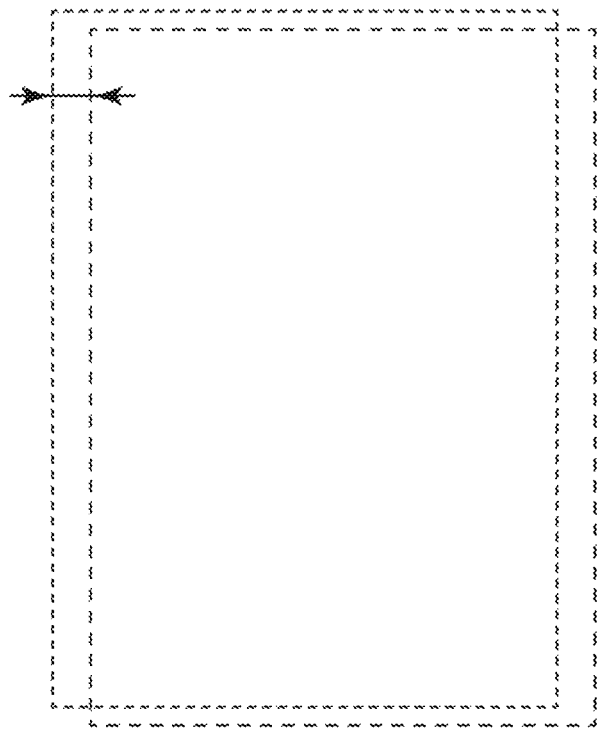
FIG. 10 is a diagram for describing a shift of an image to be printed by the image forming apparatus according to the embodiment.

FIG. 10 shows an example of a shift of a printed image. In order to favorably form a color image, there is a need for accurately aligning the positions of the images in respective colors, and a function of shifting the images in respective colors is necessary. FIG. 10 shows an example of a state in which the image forming position is shifted to the right and down. By what degree and in which direction the images in respective colors are to be shifted depend on a positional relationship between different colors.

Figure 11A:
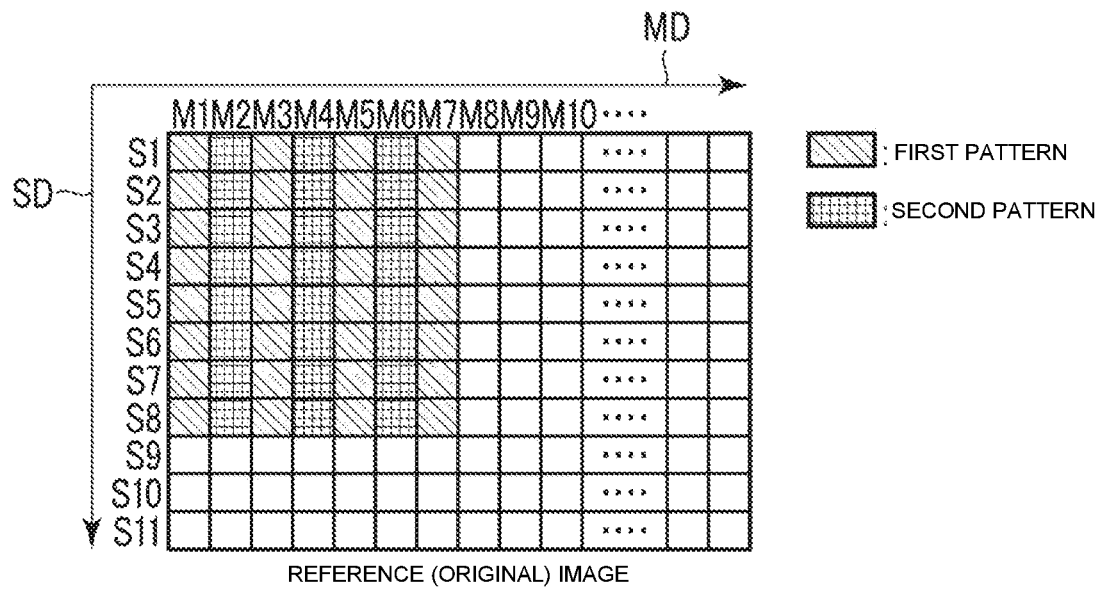
FIG. 11A is a diagram showing an example of a relationship between a reference (original) image formed by the image forming apparatus according to the embodiment and light emitting data of a first light emitting element line and a second light emitting element line of the print head.

FIG. 11A is a diagram showing an example of a reference image. FIG. 11A shows a rectangular image with pixels from a first column M1 to a seventh column M7 in the main scanning direction MD and from a first row S1 to an eighth row S8 in the sub-scanning direction SD being occupied by a first pattern and a second pattern.

The respective pixels of that image are formed by the light emitting elements 131 of the first light emitting element line 13L1 and the second light emitting element line 13L2 of the print head 1. That is, here, one pixel corresponds to one light emitting element 131. For clarifying a relationship between the first light emitting element line 13L1 and the second light emitting element line 13L2 which form the respective pixels, the pattern of the pixels is changed for each line.

A first-pattern image in odd-number columns of the 1st, 3rd, 5th, and 7th columns is formed by the light emitting elements 131 of the first light emitting element line 13L1. That is, here, the first-pattern image corresponds to the first light emitting element image data DL1. A second-pattern image in even-number columns of the 2nd, 4th, and 6th columns are formed by the light emitting elements 131 of the second light emitting element line 13L2. That is, here, the second-pattern image corresponds to the second light emitting element image data DL2.

Figure 11B:
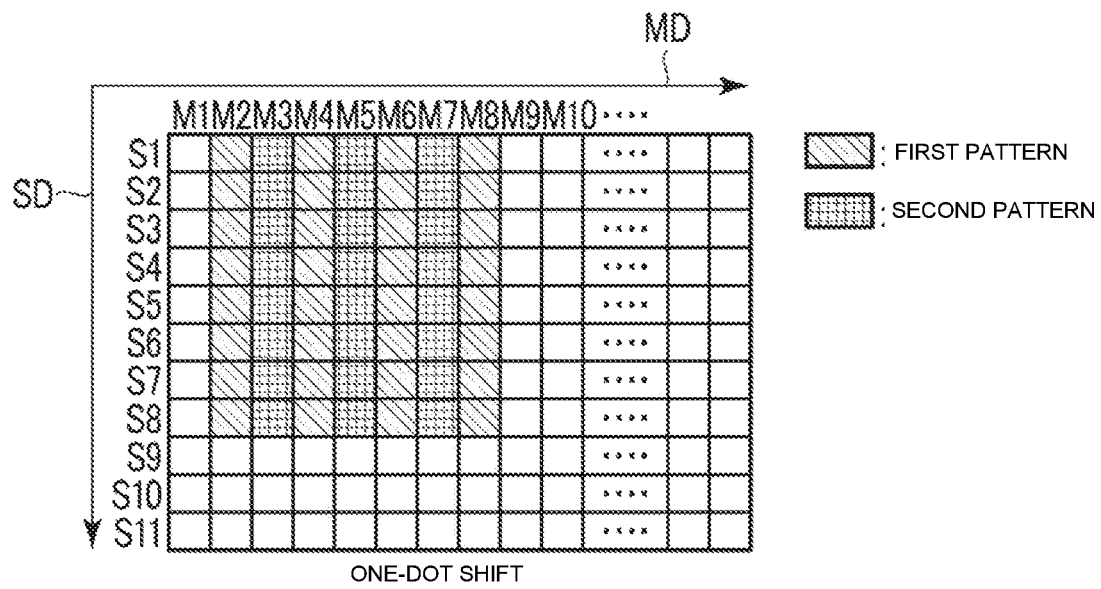
FIG. 11B is a diagram showing an example of a relationship between a one-dot shifted image formed by the image forming apparatus according to the embodiment and the light emitting data of the first light emitting element line and the second light emitting element line of the print head.

FIG. 11B is a diagram showing an example of an image obtained by shifting the rectangular image shown in FIG. 11A by one dot in the main scanning direction (to the right). The first column in the main scanning direction MD becomes blank and an image with the pixels from the second column to the eighth column being occupied by the first pattern and the second pattern is obtained. No shift is performed in the sub-scanning direction SD and the pixels from the first row to the eighth row are occupied by the first pattern and the second pattern.

The image is shifted by one dot in the main scanning direction MD (to the right). Therefore, the first-pattern image is shifted to the 2nd, 4th, 6th, and 8th columns. As a result, the first-pattern image is formed by the light emitting elements 131 of the second light emitting element line 13L2. That is, here, the first-pattern image corresponds to the second light emitting element image data DL2.

The second-pattern image is shifted to the 3rd, 5th, and 7th rows. As a result, the second-pattern image is formed by the light emitting elements 131 of the first light emitting element line 13L1. That is, here, the second-pattern image corresponds to the first light emitting element image data DL1.

Figure 11C:
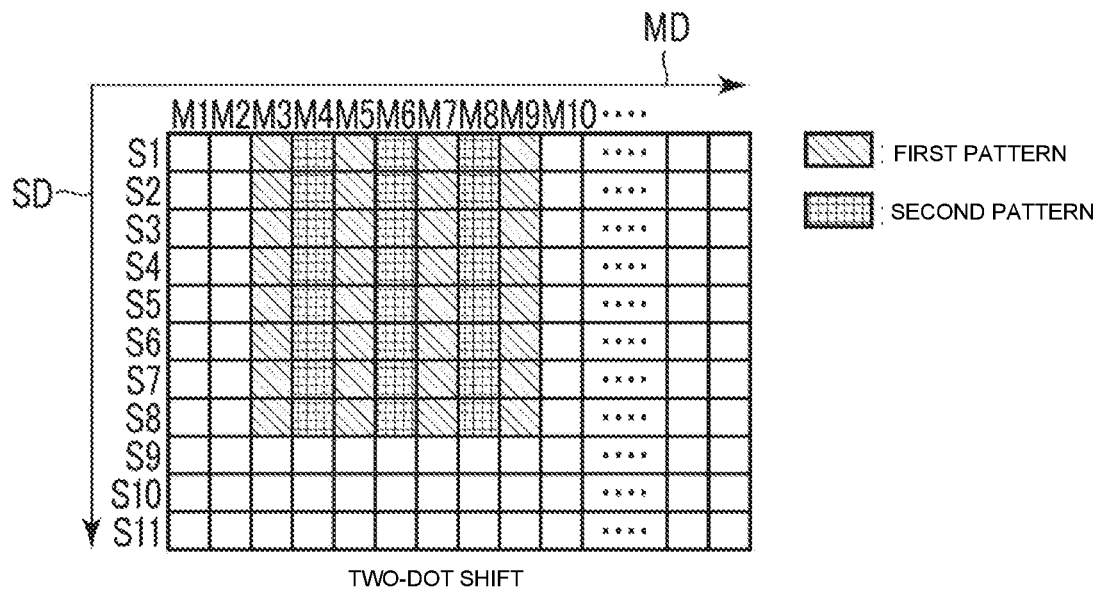
FIG. 11C is a diagram showing an example of a relationship between a two-dot shifted image formed by the image forming apparatus according to the embodiment and the light emitting data of the first light emitting element line and the second light emitting element line of the print head.

FIG. 11C is a diagram showing an example of an image obtained by shifting the rectangular image shown in FIG. 11A by two dots in the main scanning direction (to the right). The first column and the second column in the main scanning direction MD become blank, and an image with the pixels from the third column and the ninth column being occupied by the first pattern and the second pattern is obtained. No shift is performed in the sub-scanning direction SD and the pixels from the first row to the eighth row are occupied by the first pattern and the second pattern.

The image is shifted by two dots in the main scanning direction MD (to the right). Therefore, the first-pattern image is shifted to 3rd, 5th, 7th, and 9th column. As a result, the first-pattern image is formed by the light emitting elements 131 of the first light emitting element line 13L1. That is, here, the first-pattern image corresponds to the first light emitting element image data DL1.

The second-pattern image is shifted to 4th, 6th, and 8th column. As a result, the second-pattern image is formed by the light emitting elements 131 of the second light emitting element line 13L2. That is, here, the second-pattern image corresponds to the second light emitting element image data DL2.

Figure 12A:
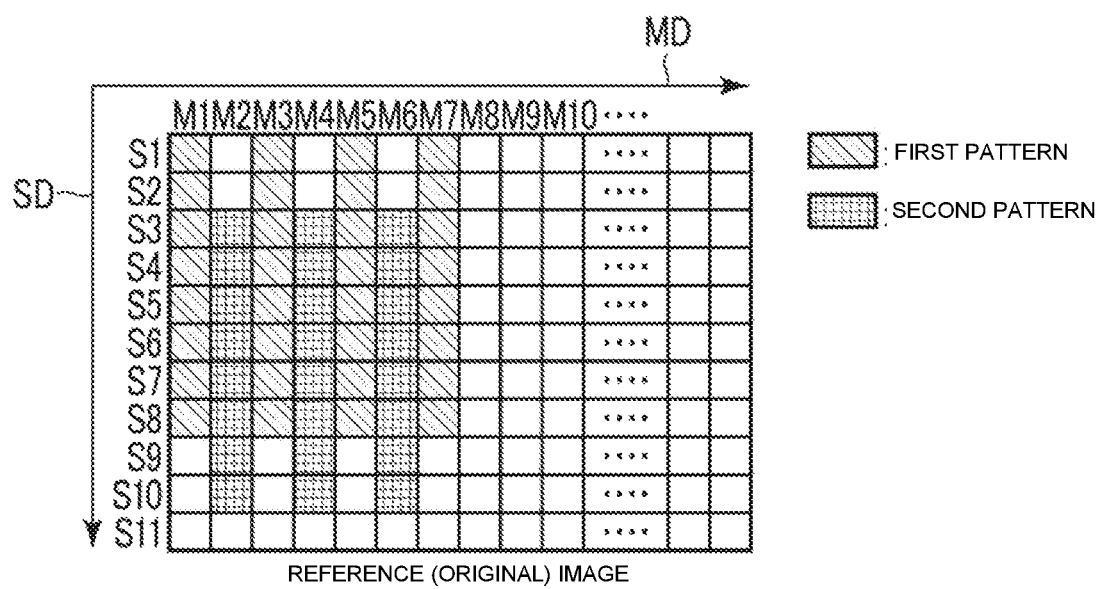
FIG. 12A is a diagram showing an example of a relationship between a reference (original) image formed by the image forming apparatus according to the embodiment and an image data array on page memories.

FIG. 12A is a diagram for describing an example of an image data arrangement change for transmitting the image shown in FIG. 11A to the print head. The image shown in FIG. 12A is obtained by shifting even-number-column images of the image shown in FIG. 11A by an amount corresponding to two rows in the sub-scanning direction SD. The first light emitting element line 13L1 and the second light emitting element line 13L2 of the print head 1 have phases (positions) deviated by the amount corresponding to two rows in the sub-scanning direction SD. Therefore, by image data transfer control of the controller 174, the image data of the even numbered columns is shifted by the amount corresponding to two rows. With this configuration, that phase difference (position deviation) is overcome and the original image is formed on the photosensitive drum 111. Here, the image data of the odd numbered columns is the first-pattern image. The first-pattern image corresponds to the first light emitting element image data DL1. The image data of the even numbered columns is the second-pattern image. The second-pattern image corresponds to the second light emitting element image data DL2.

Figure 12B:
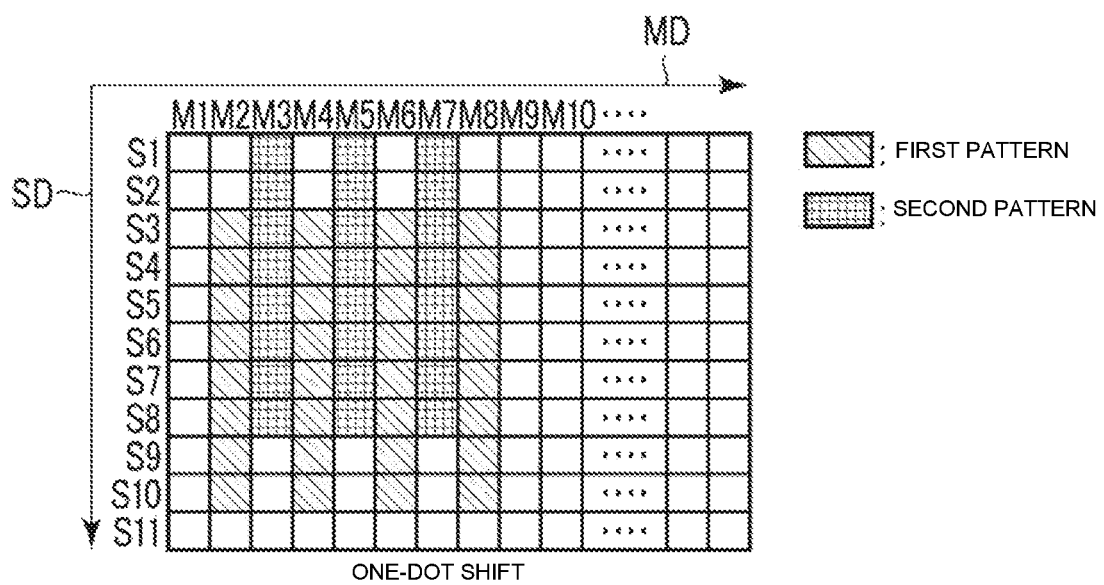
FIG. 12B is a diagram showing an example of a relationship between a one-dot shifted image formed by the image forming apparatus according to the embodiment and the image data array on the page memories.

FIG. 12B is a diagram for describing an example of the image data arrangement change for transmitting the image shown in FIG. 11B to the print head. The image shown in FIG. 12B is obtained by shifting even-number-column images of the image shown in FIG. 11B by an amount corresponding to two rows in the sub-scanning direction SD. The first light emitting element line 13L1 and the second light emitting element line 13L2 of the print head 1 have phases (positions) deviated by the amount corresponding to two rows in the sub-scanning direction SD. Therefore, the image data of the even numbered columns is shifted by the amount corresponding to two rows. With this configuration, that phase difference (position deviation) is overcome and the original image is formed on the photosensitive drum 111. Here, the image data of the even numbered columns is the first-pattern image. The first-pattern image corresponds to the second light emitting element image data DL2. The image data of the odd numbered columns is the second-pattern image. The second-pattern image corresponds to the first light emitting element image data DL1.

Figure 12C:
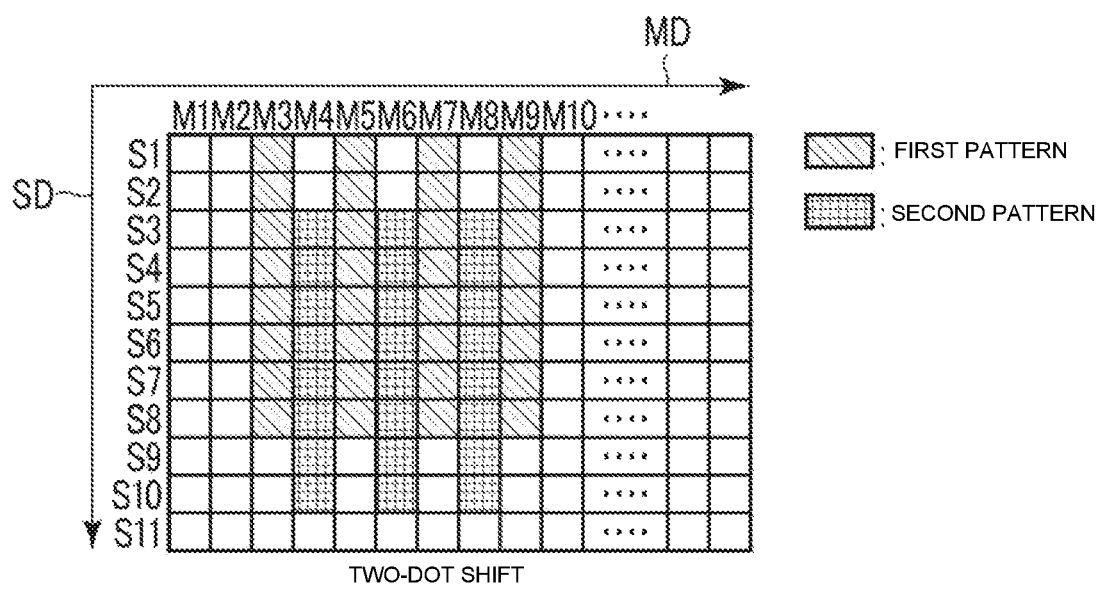
FIG. 12C is a diagram showing an example of a relationship between a two-dot shifted image formed by the image forming apparatus according to the embodiment and the image data array on the page memories.

FIG. 12C is a diagram for describing an example of the image data arrangement change for transmitting the image shown in FIG. 11C to the print head. The image shown in FIG. 12C is obtained by shifting even-number-column images of the image shown in FIG. 11C by an amount corresponding to two rows in the sub-scanning direction SD.

The first light emitting element line 13L1 and the second light emitting element line 13L2 of the print head 1 have phases (positions) deviated by the amount corresponding to two rows in the sub-scanning direction SD. Therefore, the image data of the even numbered columns is shifted by the amount corresponding to two rows. With this configuration, that phase difference (position deviation) is overcome and the original image is formed on the photosensitive drum 111. Here, the image data of the odd numbered columns is the first-pattern image. The first-pattern image corresponds to the first light emitting element image data DL1. The image data of the even numbered columns is the second-pattern image. The second-pattern image corresponds to the second light emitting element image data DL2.

Figure 13A:
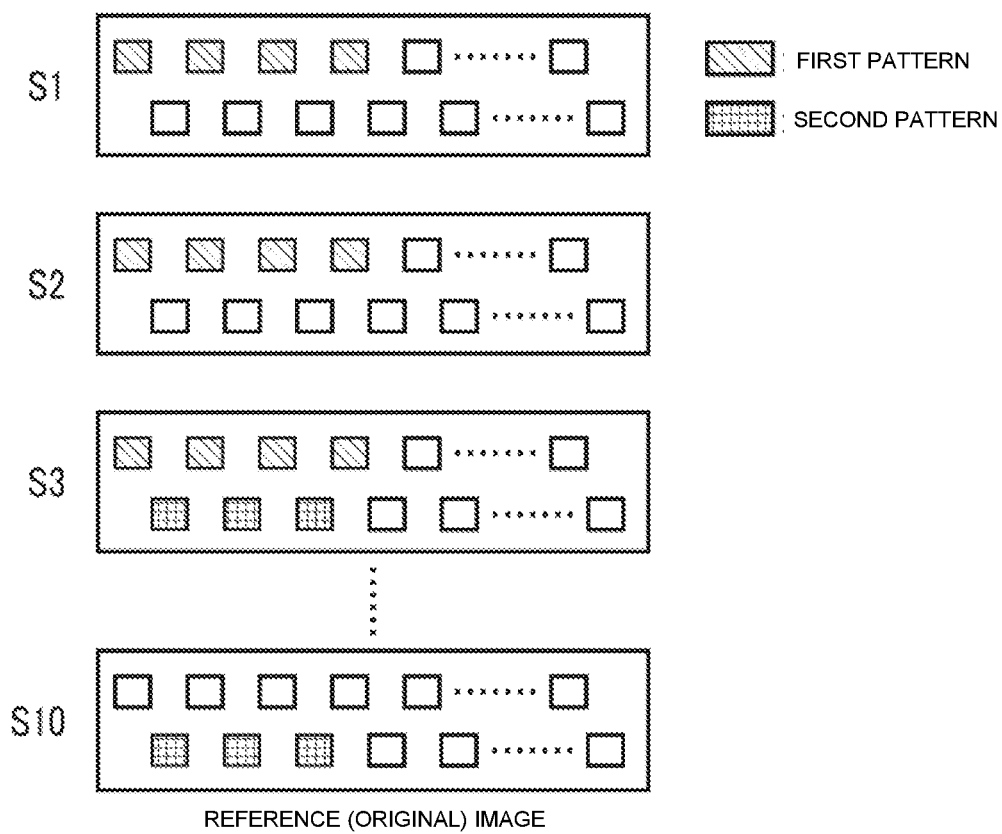
FIG. 13A is a diagram showing an example of a relationship between light emission of the light emitting elements of each of the first light emitting element line and the second light emitting element line of the print head according to the embodiment and image data of a reference (original) image to be transferred.

FIG. 13A is a diagram showing a relationship between light emission of the light emitting elements 131 of each of the first light emitting element line 13L1 and the second light emitting element line 13L2 of the print head 1 and transferred image data at the time of generation of the image shown in FIG. 12A.

When the image data of the first row S1 is transmitted, left four light emitting elements 131 of the first light emitting element line 13L1 of the print head 1 emit light, corresponding to the first-pattern image data. The image data for emitting light is not transmitted to the second light emitting element line 13L2, and thus the light emitting elements 131 of the second light emitting element line 13L2 do to emit light.

The image data of the second row S2 is the same as the image data of the first row S1. Therefore, the left four light emitting elements 131 of the first light emitting element line 13L1 emit light and the light emitting elements 131 of the second light emitting element line 13L2 do to emit light.

When the image data of the third row S3 is transmitted, the image data to the first light emitting element line 13L1 is the same as the image data of the first row S1 and the second row S2, and thus the left four light emitting elements 131 of the first light emitting element line 13L1 emit light. Light emitting image data for three pixels (for three light emitting elements) in the second pattern is transmitted to the second light emitting element line 13L2. Therefore, left three light emitting elements 131 of the second light emitting element line 13L2 emit light.

The fourth row S4 to the eighth row S8 perform the same operations as the above-mentioned third row S3.

As shown in FIG. 12A, the ninth row S9 and the tenth row S10 are the same image data. Therefore, the operation of the ninth row S9 not shown in FIG. 13A and the operation of the tenth row S10 shown in FIG. 13A are the same. That is, when the image data of the tenth row S10 is transmitted as shown in FIG. 13A, the image data to the first light emitting element line 13L1 does not include the data for emitting light, and thus the light emitting elements 131 of the first light emitting element line 13L1 do to emit light. The image data to the second light emitting element line 13L2 includes light emitting image data for three pixels (for three light emitting elements) in the second pattern. Therefore, regarding the second light emitting element line 13L2, left three light emitting elements 131 in FIG. 3A emit light.

In FIG. 12A, the eleventh row S11 and the subsequent rows do not include the light emitting image data. Therefore, any light emitting elements 131 of the first light emitting element line 13L1 and the second light emitting element line 13L2 do not emit light.

The same operation system applies to cases of the images shown in FIGS. 12B and 12C.

Figure 13B:
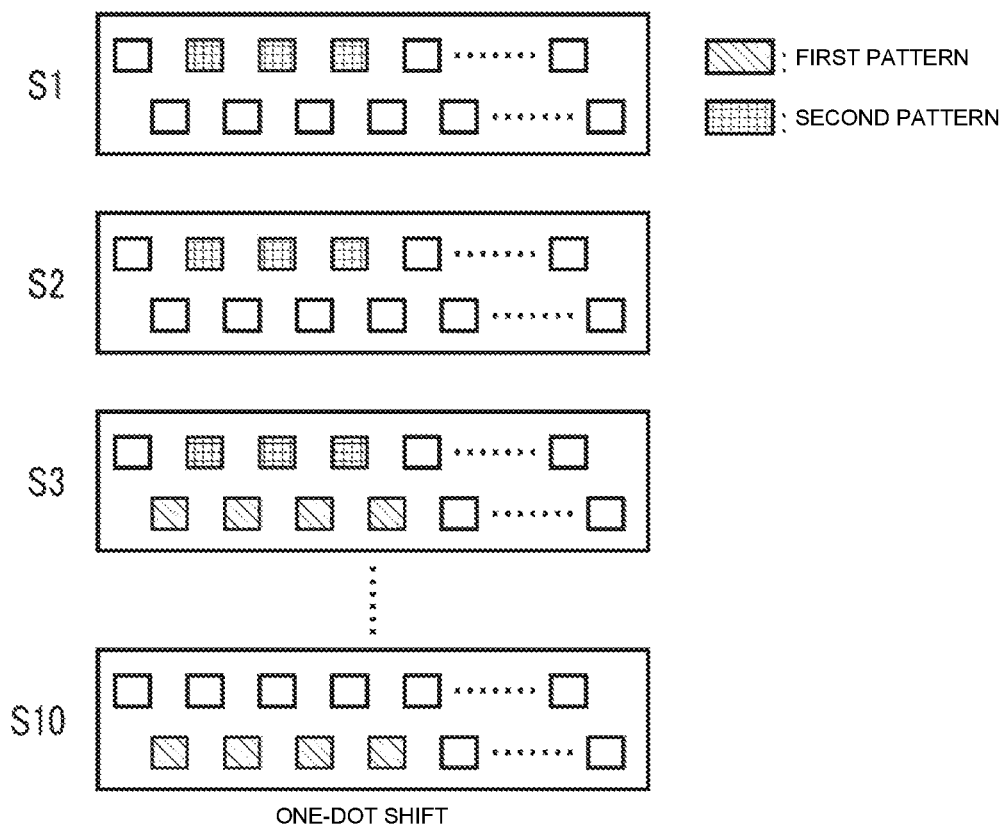
FIG. 13B is a diagram showing an example of a relationship between the light emission of the light emitting elements of each of the first light emitting element line and the second light emitting element line of the print head according to the embodiment and image data of a one-dot shifted image to be transferred.

FIG. 13B is a diagram showing a relationship between light emission of the light emitting elements 131 of each of the first light emitting element line 13L1 and the second light emitting element line 13L2 of the print head 1 and transferred image data at the time of generation of the image shown in FIG. 12B.

In the case of the image shown in FIG. 12B, the image is shifted by one dot in the main scanning direction MD (to the right). Therefore, with respect to the image data of the first row S1 and the second row S2, left second to fourth three light emitting elements 131 of the first light emitting element line 13L1 emit light. The light emitting elements 131 of the second light emitting element line 13L2 do to emit light. The light emission of the first light emitting element line 13L1 is based on the second-pattern image data.

Regarding the third row S3 to the eighth row S8, the left second to fourth three light emitting elements 131 of the first light emitting element line 13L1 emit light and left four light emitting elements 131 of the second light emitting element line 13L2 emit light. The light emission of the first light emitting element line 13L1 is based on the second-pattern image data. The light emission of the second light emitting element line 13L2 is based on the first-pattern image data.

Figure 13C:
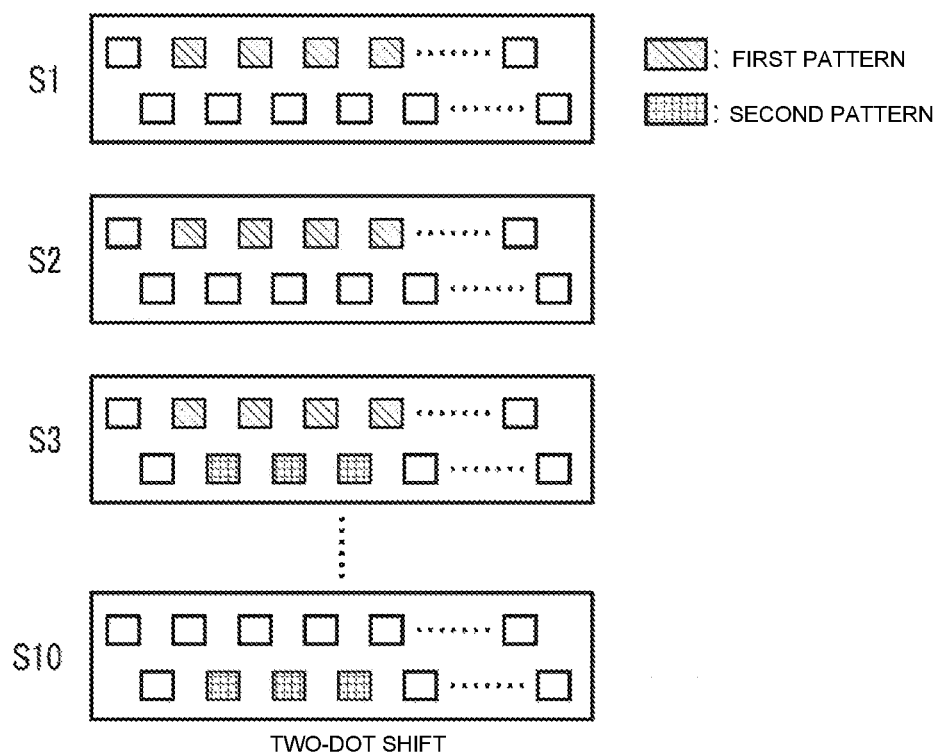
FIG. 13C is a diagram showing an example of a relationship between the light emission of the light emitting elements of each of the first light emitting element line and the second light emitting element line of the print head according to the embodiment and image data of a two-dot shifted image to be transferred.

FIG. 13C is a diagram showing a relationship between light emission of the light emitting elements 131 of each of the first light emitting element line 13L1 and the second light emitting element line 13L2 of the print head 1 and transferred image data at the time of generation of the image shown in FIG. 12C.

In the case of the image shown in FIG. 12C, the image is shifted by two dots in the main scanning direction MD (to the right). Therefore, with respect to the image data of the first row S1 and the second row S2 in FIG. 12C, left second to fifth four light emitting elements 131 of the first light emitting element line 13L1 emit light as shown in FIG. 13C. The light emitting elements 131 of the second light emitting element line 13L2 do to emit light. The light emission of the first light emitting element line 13L1 is based on the first-pattern image data.

Regarding the third row S3 to the eighth row S8 in FIG. 12C, the left second to fifth four light emitting elements 131 of the first light emitting element line 13L1 emit light and left second to fourth three light emitting elements 131 of the second light emitting element line 13L2 emit light as shown in FIG. 13C. The light emission of the first light emitting element line 13L1 is based on the first-pattern image data. The light emission of the second light emitting element line 13L2 is based on the second-pattern image data.

Figure 14A:
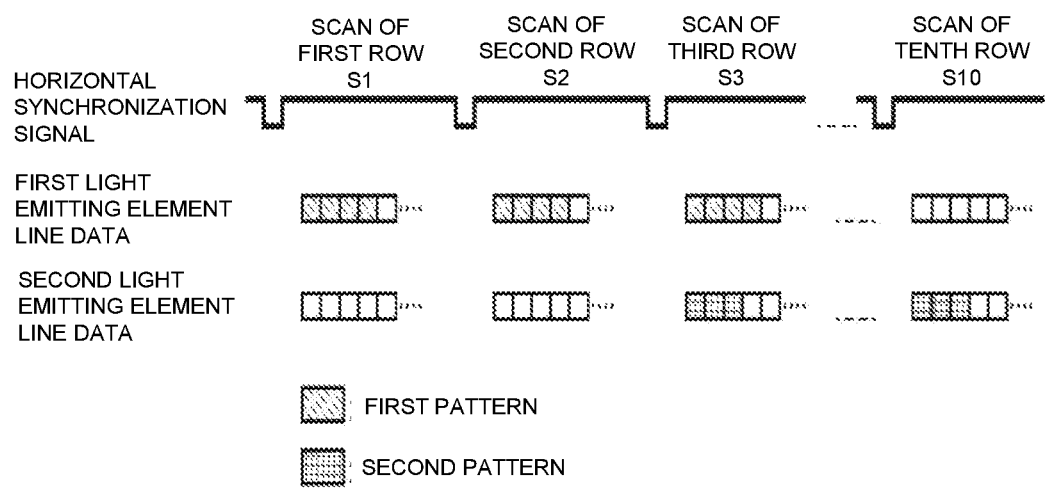
FIG. 14A is a diagram showing an example of a relationship between image data to be transferred to the first light emitting element line and image data to be transferred to the second light emitting element line from the page memories when printing a reference (original) image.

FIG. 14A is a timing chart showing an example of transfer of the image data of the image shown in FIG. 12A. A scan of the first row S1, a scan of the second row S2, a scan of the third row S3, and a scan of the tenth row S10 in FIG. 14A respectively indicate transfer of the image data for the first row S1, the second row S2, the third row S3, and the tenth row S10 in FIG. 12A.

As shown in FIG. 14A, the horizontal synchronization signal S3 is output preceding image data transfer in each scan. The horizontal synchronization signal S3 is an "L" pulse. When the first horizontal synchronization signal S3 is output, the image data transfer in the scan of the first row S1 is started.

The image data transfer in the scan of the first row S1 is FIG. 14A is the image data transfer of the first row S1 in FIG. 12A. In the first light emitting element line 13L1, the image data for first four light emitting elements is light emitting data and other image data is non-light emitting data.

The image data for the light emitting elements of the second light emitting element line 13L2 is all non-light emitting data.

The image data transfer in the scan of the second row S2 in FIG. 14A is the image data transfer of the second row S2 in FIG. 12A. Therefore, the image data transfer in the scan of the second row S2 in FIG. 14A is the same as the above-mentioned image data transfer in the scan of the first row S1.

The image data transfer in the scan of the third row S3 in FIG. 14A is the image data transfer of the third row S3 in FIG. 12A. In the first light emitting element line 13L1, the image data for first four light emitting elements is light emitting data and other image data is non-light emitting data. In the second light emitting element line 13L2, the image data for first three light emitting elements is light emitting data and other image data is non-light emitting data.

For the scan of the fourth row S4 to the eighth row S8 which are not shown in FIG. 14A, the same image data transfer as the above-mentioned image data transfer in the scan of the third row S3 is subsequently performed.

The image data transfer in the scan of the ninth row S9 not shown in FIG. 14A and the scan of the tenth row S10 shown in FIG. 14A are the image data transfer in the ninth row S9 not shown in FIG. 12A and the tenth row S10 shown in FIG. 12A. In the first light emitting element line 13L1, the image data is all non-light emitting data. In the second light emitting element line 13L2, the image data for first three light emitting elements is light emitting data and other image data is non-light emitting data.

Figure 14B:
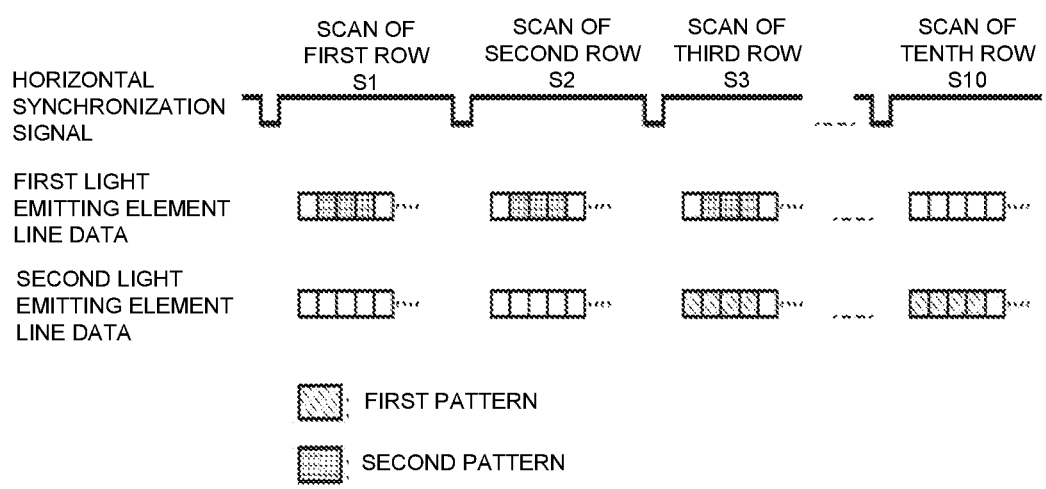
FIG. 14B is a diagram showing an example of a relationship between the image data to be transferred to the first light emitting element line and the image data to be transferred to the second light emitting element line from the page memories when printing a one-dot shifted image.

FIG. 14B is a timing chart showing an example of transfer of the image data of the image shown in FIG. 12B, that is, the image after the image shown in FIG. 12A is shifted by one dot in the main scanning direction MD (to the right).

A scan of the first row S1, a scan of the second row S2, a scan of the third row S3, and a scan of the tenth row S10 in FIG. 14B respectively indicate transfer of the image data for the first row S1, the second row S2, the third row S3, and the tenth row S10 in FIG. 12B.

As shown in FIG. 14B, the horizontal synchronization signal S3 is output preceding image data transfer in each scan. The horizontal synchronization signal S3 is an "L" pulse. When the first horizontal synchronization signal S3 is output, the image data transfer in the scan of the first row S1 is started.

The image data transfer in the scan of the first row S1 in FIG. 14B is the image data transfer of the first row S1 in FIG. 12B. In the first light emitting element line 13L1, the image data for a first light emitting element is non-light emitting data and the image data for second to fourth light emitting elements is light emitting data. The image data for fifth and subsequent light emitting elements is non-light emitting data. In the second light emitting element line 13L2, the image data is all non-light emitting data.

The image data transfer in the scan of the second row S2 in FIG. 14B is the same as the above-mentioned image data transfer in the scan of the first row S1.

The image data transfer in the scan of the third row S3 in FIG. 14B is the image data transfer of the third row S3 in FIG. 12B. In the first light emitting element line 13L1, the image data for a first light emitting element is non-light emitting data and the image data for second to fourth light emitting elements is light emitting data. The image data for fifth and subsequent light emitting elements is non-light emitting data. In the second light emitting element line 13L2, the image data for first four light emitting elements is light emitting data and other image data is non-light emitting data.

For the scan of the fourth row S4 to the eighth row S8 which are not shown in FIG. 14B, the same image data transfer as the above-mentioned image data transfer in the scan of the third row S3 is subsequently performed.

The image data transfer in the scan of the ninth row S9 not shown in FIG. 14B and the scan of the tenth row S10 shown in FIG. 14B is the image data transfer of the ninth row S9 and the tenth row S10 in FIG. 12B. In the first light emitting element line 13L1, the image data is all non-light emitting data. In the second light emitting element line 13L2, the image data for first four light emitting elements is light emitting data and other image data is non-light emitting data.

Figure 14C:
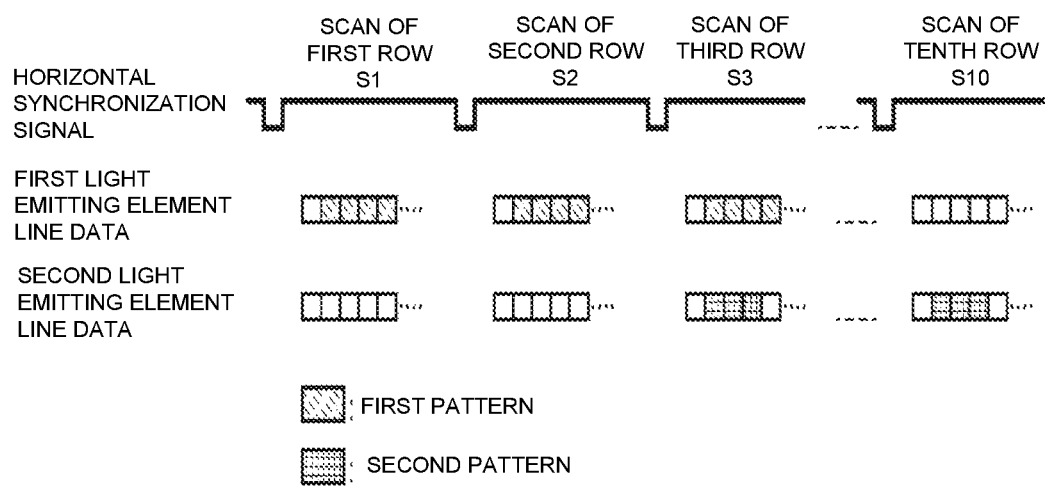
FIG. 14C is a diagram showing an example of a relationship between the image data to be transferred to the first light emitting element line and the image data to be transferred to the second light emitting element line from the page memories when printing a two-dot shifted image.

FIG. 14C is a timing chart showing an example of transfer of the image data of the image shown in FIG. 12C, that is, the image after the image shown in FIG. 12A is shifted by two dots in the main scanning direction MD (to the right).

A scan of the first row S1, a scan of the second row S2, a scan of the third row S3, and a scan of the tenth row S10 in FIG. 14C respectively indicate transfer of the image data for the first row S1, the second row S2, the third row S3, and the tenth row S10 in FIG. 12C.

As shown in FIG. 14C, the horizontal synchronization signal S3 is output preceding image data transfer in each scan. The horizontal synchronization signal S3 is an "L" pulse. When the first horizontal synchronization signal S3 is output, the image data transfer in the scan of the first row S1 is started.

The image data transfer in the scan of the first row S1 in FIG. 14C is the image data transfer of the first row S1 in FIG. 12C. In the first light emitting element line 13L1, the image data for a first light emitting element is non-light emitting data and the image data for second to fifth light emitting elements is light emitting data. The image data for sixth and subsequent light emitting elements is non-light emitting data. In the second light emitting element line 13L2, the image data is all non-light emitting data.

The image data transfer in the scan of the second row S2 in FIG. 14C is the same as the above-mentioned image data transfer in the scan of the first row S1.

The image data transfer in the scan of the third row S3 in FIG. 14C is the image data transfer of the third row S3 in FIG. 12C. In the first light emitting element line 13L1, the image data for a first light emitting element is non-light emitting data and the image data for second to fifth light emitting elements is light emitting data. The image data for sixth and subsequent light emitting elements is non-light emitting data. In the second light emitting element line 13L2, the image data for a first light emitting element is non-light emitting data and the image data for second to fourth light emitting elements is light emitting data. The image data for fifth and subsequent light emitting elements is non-light emitting data.

Thereafter, for the scan of the fourth row S4 to the eighth row S8 which are not shown in FIG. 14C, the same image data transfer as the above-mentioned image data transfer in the scan of the third row S3 is subsequently performed.

The image data transfer of the ninth row S9 not shown in FIG. 14C and the tenth row S10 shown in FIG. 14C is the image data transfer of the ninth row S9 and the tenth row S10 in FIG. 12C. In the first light emitting element line 13L1, the image data is all non-light emitting data. In the second light emitting element line 13L2, the image data for a first light emitting element is non-light emitting data and the image data for second to fourth light emitting elements is light emitting data. The image data for fifth and subsequent light emitting elements is non-light emitting data.

Figure 15:
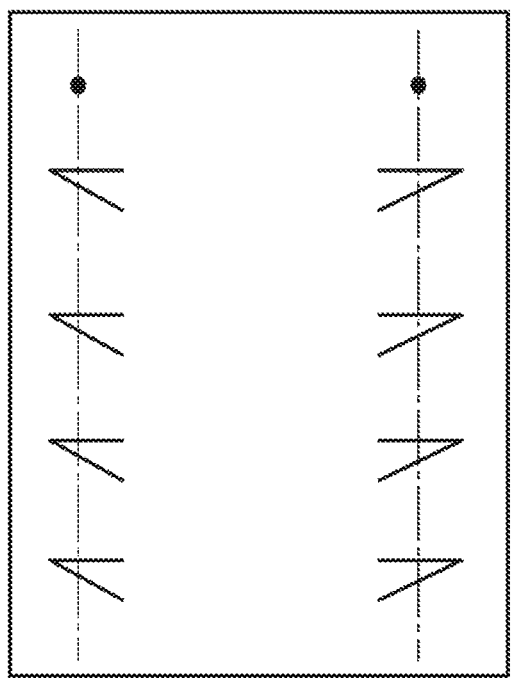
FIG. 15 is a diagram showing an example of a relationship between test patterns formed for performing color overlap control in a color-image forming apparatus employing a 4-drum tandem method and sensing positions of sensors that detect the test patterns.

FIG. 15 is a diagram showing an example of a relationship between test patterns formed on the transfer belt and detection positions of color deviation sensors that detect the test patterns in order to check a positional relationship between the images formed by the four image forming devices in the color-image forming apparatus employing the tandem method according to the embodiment.

In accordance with color registration control of the controller 174, two test patterns in respective colors are formed on the transfer belt 103 by the four image forming devices 102-Y, 102-M, 102-C, and 102-K shown in FIG. 7. The test patterns include a combination of non-parallel straight lines, for example.

When the test patterns pass by detection points of the color deviation sensors which are shown as the long dashed short dashed lines in FIG. 15, the color deviation sensors output pulses in accordance with the passage of straight lines included in the test patterns.

That is, when the non-parallel test patterns pass by the detection points of the color deviation sensors, the color deviation sensors output two pulses in accordance with the passage and the controller 174 detects two pulses.

The controller 174 detects the test patterns formed in a direction orthogonal to a travel direction of the transfer belt 103 in accordance with the outputs from the color deviation sensors. That is, the controller 174 detects image forming positions in the sub-scanning direction. Further, the controller 174 detects forming positions of the test patterns in the main scanning direction on the basis of a time interval between the two pulses. The controller 174 detects the test patterns in respective colors in accordance with the outputs from the left and right two color deviation sensors. That is, the controller 174 detects an image forming position relationship between the respective colors.

Based on those detection results of the test patterns, the controller 174 controls the forming positions of the images in respective colors such that the color image has no deviation.

A specific method of detecting a degree of deviation of the color image on the basis of the test patterns has been described in, for example, Japanese Patent Application Laid-open No. HEI 8-278680.

In order to control the image forming position in the main scanning direction in the image forming apparatus 100 in which the print head 1 including the first light emitting element line 13L1 and the second light emitting element line 13L2 forms an image, it is necessary to change the image data transfer to the first light emitting element line 13L1 and the second light emitting element line 13L2.

The method of changing the image forming position in the main scanning direction has been described in the description of FIG. 13B and the like by exemplifying the case where the image is shifted by one dot in the main scanning direction. A change in the image forming position for preventing the color image from having a deviation can also be realized by using a method similar to that method.

Figure 16:
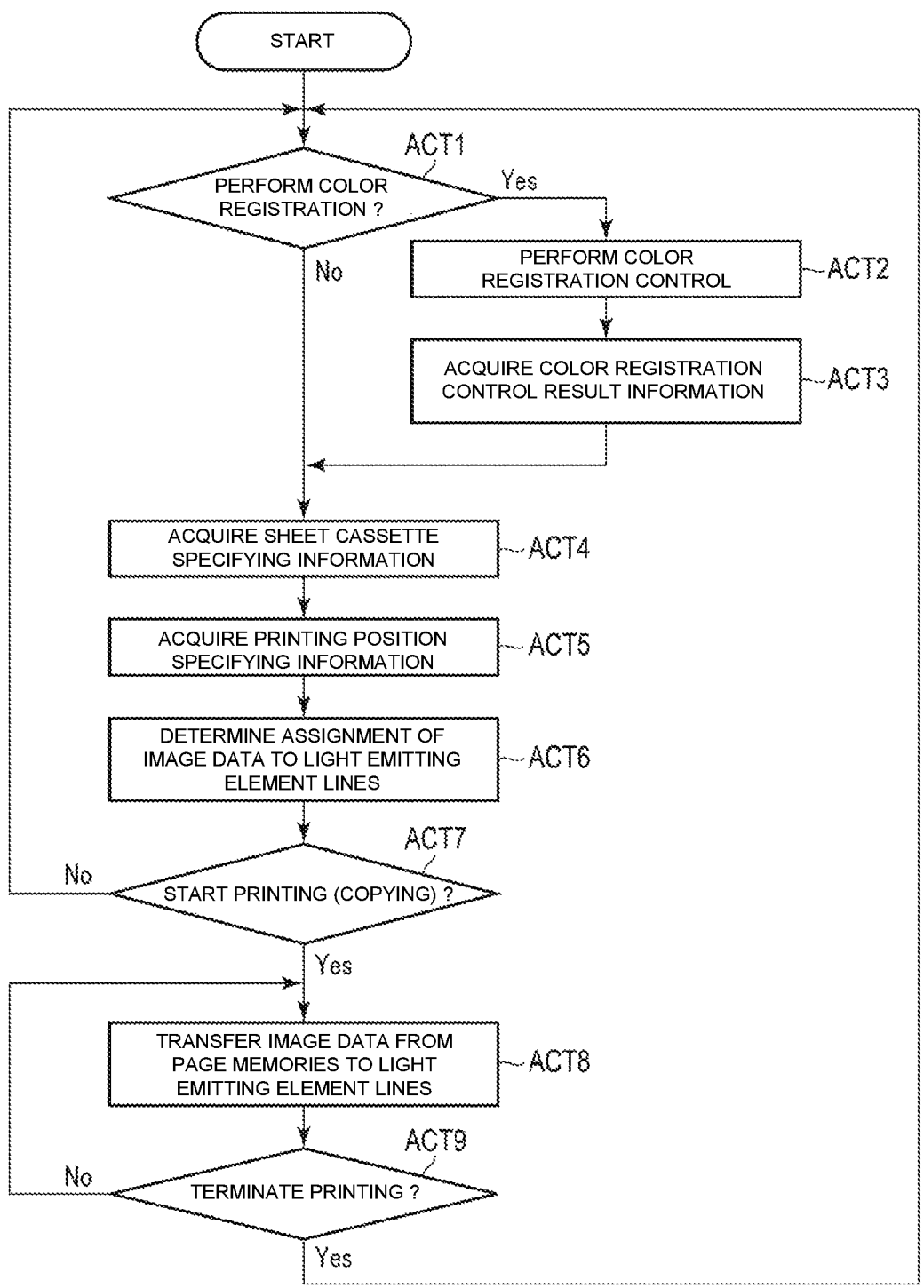
FIG. 16 is a diagram showing an example of control of an image forming position of the color-image forming apparatus employing the 4-drum tandem method.

FIG. 16 is a flowchart showing an operation example related to control of the image forming position (main-scanning-direction range) according to the embodiment. Here, control on the image forming position which is based on two image forming conditions of the color registration (color overlap control) and the sheet size will be described, though the embodiment is not limited thereto. For example, the image forming position may be controlled on the basis of an image forming condition which is at least one of the color registration (color overlap control), the sheet size, or the margin setting.

In ACT1 of FIG. 16, the controller 174 determines whether or not the color registration (color overlap control) is to be performed. If the controller 174 determines that the color registration is not to be performed (ACT1, NO), the processing of the controller 174 proceeds to ACT2 to be described later. If the controller 174 determines that the color registration is to be performed (ACT1, YES), the processing of the controller 174 proceeds to ACT2. In ACT2, the controller 174 performs color registration control. Specifically, the controller 174 forms a test pattern on the transfer belt 103. The controller 174 reads that test pattern by means of the color deviation sensor 181. If the controller 174 determines that the position of the test pattern in each color is not located at a predetermined position, the controller 174 changes the forming position of the test pattern and repeats reading of the position by means of the color deviation sensor 181 until the forming position of the test pattern is adjusted to the predetermined position.

Subsequently in ACT3, the controller 174 acquires color registration control result information. Specifically, when the controller 174 determines that the forming position of the image in each color is adjusted to the predetermined position, the controller 174 stores a condition of the forming position of the image in each color in the nonvolatile memory 177. Here, the stored condition (control result information) includes information regarding writing-start timings of images, image data positions in the page memories 180-Y, 180-M, 180-C, and 180-K, and the like. Position information of the image data in the page memories 180-Y, 180-M, 180-C, and 180-K includes information regarding a main scanning direction, a sub-scanning direction, a tilt, and the like.

Next, in ACT4, the controller 174 acquires sheet cassette specifying information. The sheet cassette specifying information is specified through the communication I/F 178 at the time of printing. The sheet cassette specifying information is specified via the control panel 179 at the time of copying. In this manner, the sheet cassette specifying information is acquired. Here, the controller 174 can acquire information regarding the margin setting. The information regarding the margin setting is specified through the communication I/F 178 at the time of printing. The information regarding the margin setting is specified via the control panel 179 at the time of copying. In this manner, the information regarding the margin setting is acquired. It should be noted that the information regarding the margin setting includes the information regarding the margin setting in the main scanning direction and the information regarding the margin setting in the sub-scanning direction.

Next, in ACT5, the controller 174 acquires printing position specifying information. Specifically, the controller 174 determines a final image forming position (printing position) for each color on the basis of the color registration control result information and the sheet cassette specifying information, and stores a condition of that final image forming position in the nonvolatile memory 177. It should be noted that the controller 174 may determine a final image forming position on the basis of at least one of the color registration control result information, the sheet cassette specifying information, or the information regarding the margin setting and may store a condition of that final image forming position in the nonvolatile memory 177. In a case of forming a color image, the controller 174 determines a final image forming position for each color and stores a condition of that final image forming position in the nonvolatile memory 177.

Next, in ACT6, the controller 174 determines assignment of the image data for the first light emitting element line 13L1 and the second light emitting element line 13L2. Specifically, the controller 174 controls the arrangement of the image data in the page memories 180-Y, 180-M, 180-C, and 180-K in accordance with the condition (see ACT5) of the final image forming position. The controller 174 determines the arrangement of the image data in the page memories 180-Y, 180-M, 180-C, and 180-K. The controller 174 determines the image data to be transferred to the first light emitting element line 13L1 and the second light emitting element line 13L2 of the print head 1 in accordance with the arrangement of the image data. That is, the controller 174 functions as an assigning unit and determines a main-scanning-direction range of the image by light exposure on the basis of the arrangement of the image data in the page memories 180-Y, 180-M, 180-C, and 180-K. The controller 174 sequentially assigns the image data for the first light emitting element image data DL1 and the second light emitting element image data DL2 on the basis of the determined main-scanning-direction range.

Next, in ACT7, the controller 174 determines whether or not printing or copying is to be started. If the controller 174 determines that printing or copying is to be started (ACT7, YES), the processing of the controller 174 proceeds to ACT8. In ACT8, the controller 174 transfers the image data (first light emitting element image data DL1 and second light emitting element image data DL2) from the page memories 180-Y, 180-M, 180-C, and 180-K to the print head 1. The first light emitting element line 13L1 and the second light emitting element line 13L2 of the light emitting elements 131 emit light in accordance with the transferred image data to expose the photosensitive drum 111 to light.

Next, in ACT9, the controller 174 determines whether or not printing or copying is to be terminated. If the controller 174 determines that printing or copying is to be terminated (ACT9, YES), the processing of the controller 174 returns to the start state. Further, if the controller 174 determines that printing or copying is not to be terminated (ACT9, NO), the processing of the controller 174 returns to ACT8. It should be noted that, if the controller 174 determines that printing or copying is not to be terminated (ACT7, NO) in ACT7, the processing of the controller 174 returns to the start state.

Figure 17:
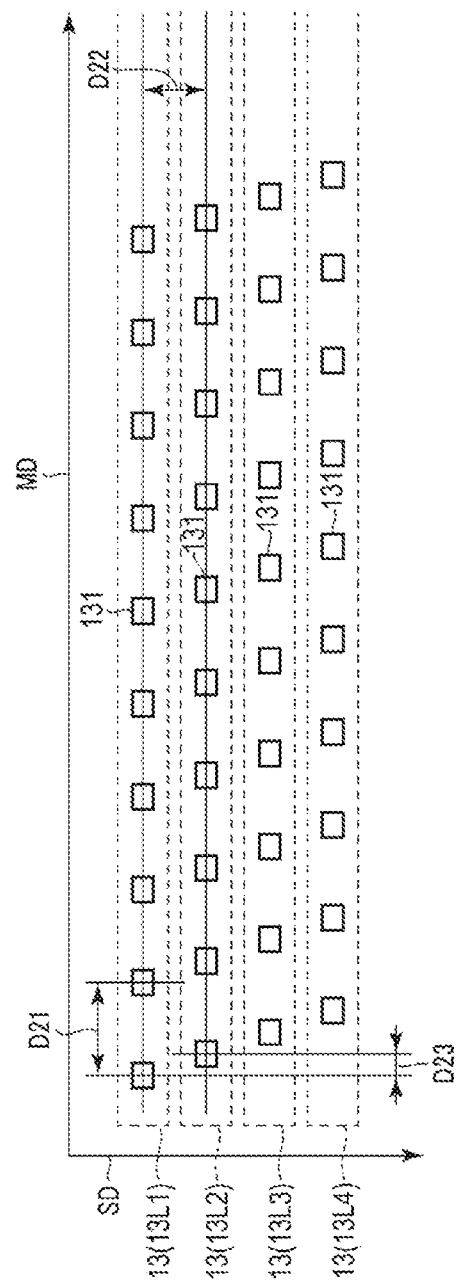
FIG. 17 is a diagram showing an example of the print head (4-row head) according to the embodiment, which is a diagram showing a light emitting element array on the transparent substrate.

FIG. 17 shows an example of the light emitting element lines 13 of the print head (4-row head) according to the embodiment.

As shown in FIG. 17, each of light emitting element lines (first light emitting element line 13L1, second light emitting element line 13L2, third light emitting element line 13L3, and fourth light emitting element line 13L4) includes a plurality of light emitting elements 131 arrayed in the main scanning direction MD which is a direction orthogonal to the movement direction (sub-scanning direction SD) of the photosensitive drum 111. That is, an array direction of the plurality of light emitting elements 131 that form the light emitting element line 13L1 of the first line, an array direction of the plurality of light emitting elements 131 that form the light emitting element line 13L2 of the second line, an array direction of the plurality of light emitting elements 131 that form the light emitting element line 13L3 of the third line, and an array direction of the plurality of light emitting elements 131 that form the light emitting element line 13L4 of the fourth column are parallel to one another in the main scanning direction MD.

The arrangement interval (pitch) D21 between the light emitting elements 131 of the 4-row head is the same as the arrangement interval (pitch) D11 between the light emitting elements 131 of the two-line head shown in FIG. 3. Further, the light emitting element lines 13 in the first line, the second line, the third line, and the fourth line of the 4-row head are arranged having an interval therebetween, which is a distance D22 in the sub-scanning direction SD. A shorter phase difference (pitch) D23 between elements arranged in lines of the 4-row head, which are adjacent to each other, is ¼ of the arrangement interval (pitch) D21. By using such a light emitting element arrangement, the image can be formed at four times the resolution of the light emitting element arrangement pitch between the respective light emitting element lines in the main scanning direction.

Figure 18A:
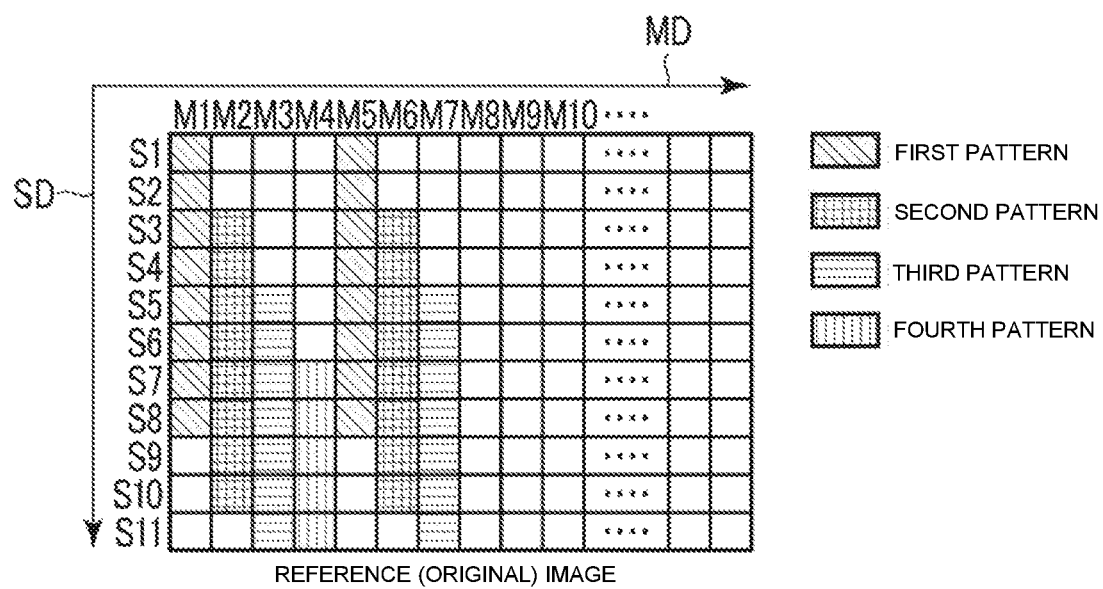
FIG. 18A is a diagram showing an example of a relationship between a reference (original) image formed by the image forming apparatus (4-row head) according to the embodiment and an image data array on the page memories.
Figure 18B:
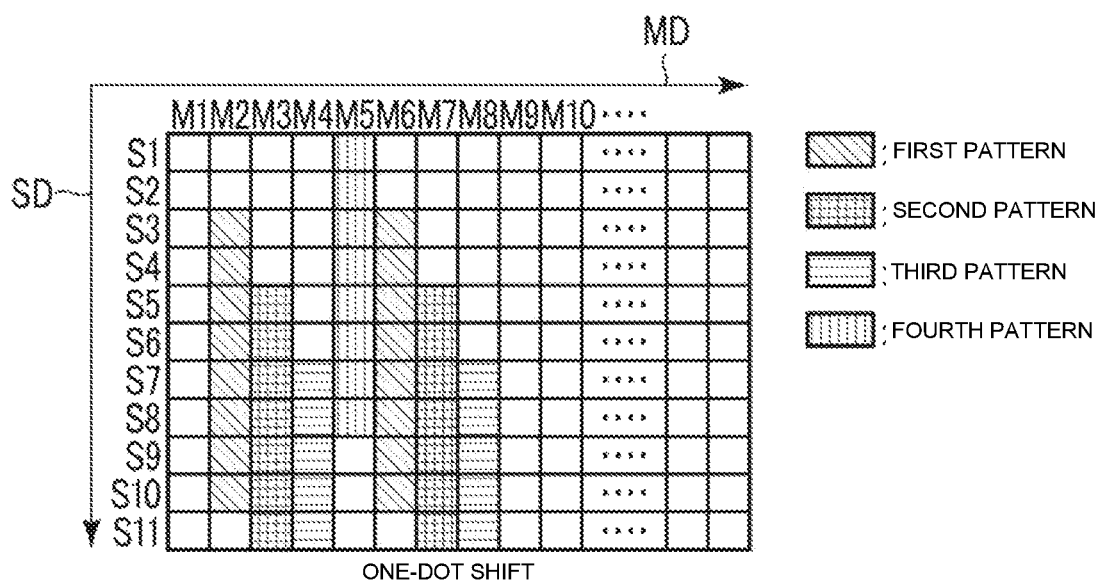
FIG. 18B is a diagram showing an example of a relationship between a one-dot shifted image formed by the image forming apparatus (4-row head) according to the embodiment and the image data array on the page memories.
Figure 18C:
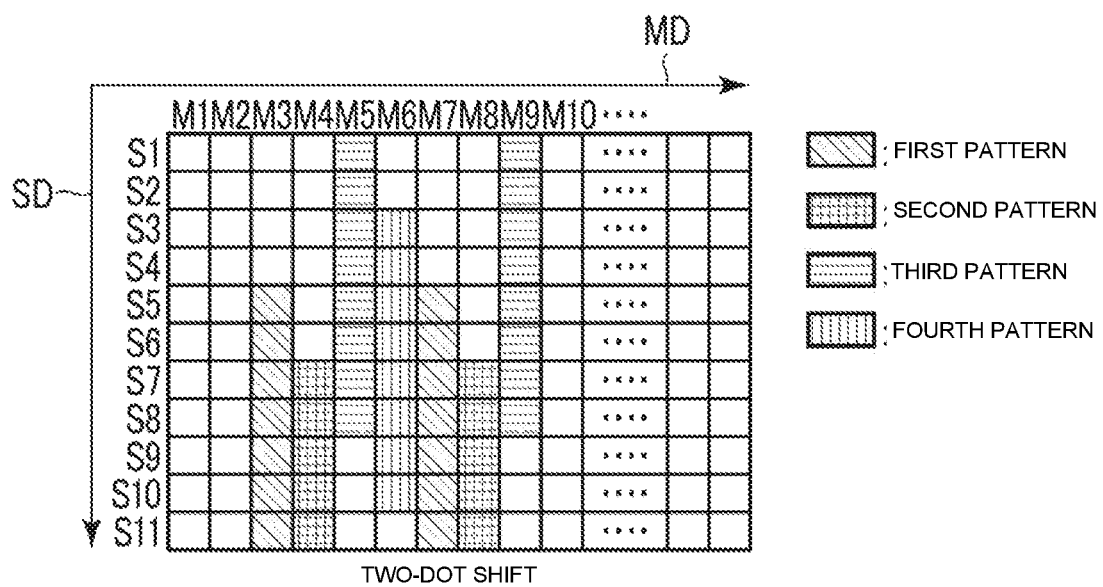
FIG. 18C is a diagram showing an example of a relationship between a two-dot shifted image formed by the image forming apparatus (4-row head) according to the embodiment and the image data array on the page memories.

FIG. 18A is a diagram for describing an example of the image data arrangement change. The image data arrangement change shown in FIG. 18A converts the arrangement of the image data as in FIG. 12A. Regarding the image data arrangement change shown in FIG. 12A, the arrangement of the image data is changed for each line (in one-line cycle). In contrast, in order to cope with the light emitting element arrangement of the 4-row head, the arrangement of the image data is changed for every four lines (in four-line cycle) as shown in FIG. 18. The phase difference of the data arrangement from an adjacent line corresponds to the phase difference of the light emitting element from the adjacent line. FIG. 18A shows an example of the arrangement of the image data with respect to the reference (original) image. FIG. 18B shows an example of the arrangement of the image data with respect to an image obtained by shifting the reference (original) image to the right by one dot. FIG. 18C shows an example of the arrangement of the image data with respect to an image obtained by shifting the reference (original) image to the right by two dots.

Transfer procedures for transferring the image data shown in FIGS. 18A to 18C from the page memories 180-Y, 180-M, 180-C, and 180-K to the respective light emitting element lines 13 are similar to those of FIGS. 14A, 14B, and 14C. Here, descriptions thereof will be omitted.

In accordance with the above-mentioned embodiment, it is possible to form a high-resolution image by using a plurality of light emitting element lines and to finely control an image forming position thereof. With the fine control of the image forming position, an image can be formed at an optimal position with respect to a sheet selected from sheets of a plurality of sizes. Further, with the fine control of the image forming position, when a position of an image to be printed on a sheet is specified, the image can be accurately formed at the specified position on the sheet. For example, when images in a plurality of colors are superposed, the images in respective colors can be accurately superposed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus that forms an image on a basis of image data, comprising:

a page memory that stores image data for an image to be formed, the image data including first image data and second image data;

a print head that performs output to form the image based on the image data; and a controller that controls transfer of the first image data and the second image data to the print head from the page memory, wherein the print head includes:

a substrate extending in a main scanning direction of the image, a first output element line which is arranged at a first row position in a sub-scanning direction, the first output element line extending along the main scanning direction on the substrate and including a plurality of output elements that perform output based on the image data, and a second output element line which is arranged at a second row position in the sub-scanning direction, the second output element line extending along the main scanning direction on the substrate, the second row position being offset different the first position the sub-scanning direction, which is orthogonal to the main scanning direction, the second output element line including a plurality of output elements that perform output based on the image data, the plurality of output elements of the second output element line are arranged on the substrate at positions offset at a certain spacing interval between adjacent output elements along the main scanning direction with respect to positions of the plurality of output elements of the first output element line such that output elements at the first row position do not align, along the sub-scanning direction, with output elements at the second row position, and the controller, in a case where a position of the image to be formed is to be shifted by a shift amount:

determines to which one of the first output element line or the second output element line to transfer the first image data according to the shift amount, and transfers the second image data to the other one of the first output element line or the second output line to which the first image data was determined to be transferred to according to the shift amount.

2. The image forming apparatus according to claim 1, wherein the shift includes shifting the position where the image is formed relative to the center of the print head along the main scanning direction.

3. The image forming apparatus according to claim 2, further comprising:

a plurality of sheet cassettes capable of storing sheets of different sizes for image formation, wherein the controller determines to which one of the first output element line or the second output element line to transfer the first image data according to the shift amount relative to the center of a sheet stored in one of the plurality of sheet cassettes selected to supply the sheet for image formation.

4. The image forming apparatus according to claim 1, wherein the controller is configured to:

perform color registration control, and determine the shift amount based on the color registration control.

5. The image forming apparatus according to claim 1, further comprising:

a photosensitive drum that extends in the main scanning direction and is rotatable in the sub-scanning direction, and a developer that uses toner to develop an electrostatic latent image on the photosensitive drum in accordance with the image data, wherein the first output element line is a first light emitting element line including a plurality of light emitting elements that emit light to form the electrostatic latent image on the photosensitive drum, and the second output element line is a second light emitting line including a plurality of light emitting elements that emit light to form the electrostatic latent image of the photosensitive drum.

6. The image forming apparatus according to claim 5, wherein the shift includes shifting the position where the image is formed relative to the center of the image along the main scanning direction.

7. The image forming apparatus according to 6, further comprising:

a plurality of sheet cassettes capable of storing sheets of different sizes for image formation, wherein the controller determines which one of the first light emitting element line or the second light emitting element line to transfer the first image data according to the shift amount relative to the center of a sheet stored in one of the plurality of sheet cassettes selected to supply the sheet for image formation.

8. The image forming apparatus according to claim 5, wherein the controller is configured to:

perform color registration control for a plurality of different colors, determine shift amounts based on the color registration control for each of the different colors, and separately determine to which one of the first light emitting element line or the second light emitting element line to transfer the first image data for each color of the different colors according to the determined shift amount for the respective different color.

9. The image forming apparatus according to claim 5, wherein the print head includes a plurality of light emitting diodes.

10. The image forming apparatus according to claim 5, wherein the print head includes a plurality of organic light emitting diodes.

11. The image forming apparatus according to claim 10, wherein the shift includes shifting the position where the image is formed relative to the center of the print head along the main scanning direction.

12. The image forming apparatus according to claim 10, further comprising:

a plurality of sheet cassettes capable of storing sheets of different sizes for image formation, wherein the controller determines to which one of the first light emitting element line and the second light emitting element line to transfer the first image data according to the shift amount relative to the center of a sheet stored in one of the plurality of the sheet cassettes selected to supply the sheet for image formation.

13. The image forming apparatus according to claim 10, wherein the controller is configured to:

perform color registration control for a plurality of different colors, determine shift amounts based on the color registration control for each of the different colors, and separately determine to which one of the first light emitting element line or the second light emitting element line to transfer the first image data for each of the different colors according to the determined shift amount for the respective different color.

* * * * *